US012308947B2

(12) United States Patent
Ma et al.

(10) Patent No.: US 12,308,947 B2
(45) Date of Patent: May 20, 2025

(54) CONCURRENT CODE DIVISION AND FREQUENCY DIVISION SIGNALING VIA AN UPLINK CHANNEL

(71) Applicant: QUALCOMM Incorporated, San Diego, CA (US)

(72) Inventors: Jun Ma, San Diego, CA (US); Danlu Zhang, San Diego, CA (US); Qiang Wu, San Diego, CA (US); Lianghai Ji, San Diego, CA (US); Liangping Ma, San Diego, CA (US); Huilin Xu, Temecula, CA (US); Mohamad Sayed Hassan, Paris (FR); Karthik Anantha Swamy, La Jolla, CA (US); Weimin Duan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/944,036

(22) Filed: Sep. 13, 2022

(65) Prior Publication Data

US 2024/0089023 A1  Mar. 14, 2024

(51) Int. Cl.
*H04J 13/16* (2011.01)
*H04J 11/00* (2006.01)
(Continued)

(52) U.S. Cl.
CPC ............... *H04J 13/16* (2013.01); *H04J 11/00* (2013.01); *H04W 74/0833* (2013.01); *H04J 2011/0006* (2013.01); *H04W 88/06* (2013.01)

(58) Field of Classification Search
CPC .... H04J 13/16; H04J 11/00; H04J 2011/0006; H04W 74/0833; H04W 88/06;
(Continued)

(56) References Cited

U.S. PATENT DOCUMENTS

2004/0196804 A1* 10/2004 Love ................. H04W 56/0045
370/329
2008/0182615 A1* 7/2008 Xue ..................... H04W 48/16
455/552.1
(Continued)

FOREIGN PATENT DOCUMENTS

EP         3297306 A1    3/2018
WO    WO-2005074166 A1    8/2005

OTHER PUBLICATIONS

International Search Report and Written Opinion—PCT/US2023/073321—ISA/EPO—Jan. 9, 2024.
(Continued)

*Primary Examiner* — Kiet Tang
(74) *Attorney, Agent, or Firm* — Holland & Hart LLP

(57) ABSTRACT

Methods, systems, and devices for wireless communication at a user equipment (UE) are described. A UE may operate by asynchronously transmitting code division multiple access (CDMA) uplink signals to a network entity. The UE
(Continued)

may transmit the CDMA signals via an uplink channel that may be shared with orthogonal frequency multiplexing (OFDM) signaling transmitted by one or more other UEs. The UE may indicate to the network entity a capability for communicating with CDMA waveforms and may use CDMA waveforms based on transmitting the indication. The UE may also receive one or more parameters associated with using the CDMA waveforms, and may use CDMA waveforms based on the one or more parameters. The uplink channel may be a random access channel (RACH) and may support RACH transmissions, or may be a data channel and support data transmissions.

28 Claims, 16 Drawing Sheets

(51) Int. Cl.
*H04W 74/0833* (2024.01)
*H04W 88/06* (2009.01)

(58) Field of Classification Search
CPC ... H04W 8/24; H04W 48/16; H04W 56/0045; H04W 72/121; H04W 52/42; H04L 5/0053; H04L 27/2601; H04B 1/707; H04B 1/7107
See application file for complete search history.

(56) References Cited

U.S. PATENT DOCUMENTS

2011/0164659 A1* 7/2011 Kawamura ........... H04W 52/42
375/E1.034
2020/0313754 A1* 10/2020 Wang .................. H04W 72/121

OTHER PUBLICATIONS

Qualcomm Incorporated: "Channel Structure for Two-Step RACH", 3GPP TSG-RAN WG1 Meeting #96, R1-1902977, Channel Structure for Two-Step RACH, 3rd Generation Partnership Project, Mobile Competence Centre, 650, Route Des Lucioles, F-06921, Sophia-Antipolis Cedex, France, vol. RAN WG1, No. Athens, Greece, Feb. 25, 2019-Mar. 1, 2019, 10 Pages, Feb. 16, 2019, XP051600674, Proposal 5, p. 8, p. 3, Paragraph 2.2, Figure 3.
Samsung: "Uplink Timing Advance/RACH Procedure and Synchronization for NTN", 3GPP TSG RAN WG1 Meeting #96bis, R1-1904438, R1-1904438_Initial and Random Access for NTN_SS, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019, 7 Pages, p. 6, Line 1-Line 14.
Yun S., et al., "Hybrid Division Duplex System for Next-Generation Cellular Services", IEEE Transactions on Vehicular Technology, IEEE, USA, vol. 56, No. 5, Sep. 1, 2007, pp. 3040-3059, XP011192667, p. 3042-p. 3045, Figures 1, 2, 5.

* cited by examiner

CONCURRENT CODE DIVISION AND FREQUENCY DIVISION SIGNALING VIA AN UPLINK CHANNEL

FIELD OF TECHNOLOGY

The following relates to wireless communication at a user equipment (UE), including concurrent code division and frequency division signaling via an uplink channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, a user equipment (UE) may maintain accurate positioning with a network entity, such that the UE and terrestrial network entity may communicate synchronously. In some cases, however, the UE may not support synchronous operations.

SUMMARY

The described techniques relate to improved methods, systems, devices, and apparatuses that support concurrent code division and frequency division signaling via an uplink channel. For example, the described techniques provide for a user equipment (UE) to perform asynchronous communications using a code division multiple access (CDMA) based waveform, such that the UE may communicate with a network entity (e.g., non-terrestrial or terrestrial network entity) using the CDMA waveforms. The UE may indicate to the network entity a capability for communicating with CDMA waveforms and may use CDMA waveforms based on transmitting the indication. The UE may also receive one or more parameters associated with using the CDMA waveforms, and may use CDMA waveforms based on the one or more parameters. The CDMA waveforms may be transmitted via an uplink channel, which may be shared with orthogonal frequency division multiple access (OFDMA) waveforms (e.g., transmitted by one or more other UEs). In some cases, the uplink channel for CDMA transmissions may be divided into CDMA sub channels for the CDMA transmissions. The uplink channel may be a random access channel (RACH) and may support RACH transmissions, or may be a data channel and support data transmissions. In some cases, the UE may transition from CDMA to OFDMA transmissions after establishing a timing adjustment with the network.

A method for wireless communication at a UE is described. The method may include transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, receiving a second indication of one or more parameters for the CDMA transmissions that use the uplink channel, and transmitting a CDMA signal via the uplink channel using the one or more parameters based on transmitting the first indication that the UE supports the CDMA transmissions that use the uplink channel.

An apparatus for wireless communication at a UE is described. The apparatus may include a processor, memory coupled with the processor, and instructions stored in the memory. The instructions may be executable by the processor to cause the apparatus to transmit, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, receive a second indication of one or more parameters for the CDMA transmissions that use the uplink channel, and transmit a CDMA signal via the uplink channel using the one or more parameters based on transmitting the first indication that the UE supports the CDMA transmissions that use the uplink channel.

Another apparatus for wireless communication at a UE is described. The apparatus may include means for transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, means for receiving a second indication of one or more parameters for the CDMA transmissions that use the uplink channel, and means for transmitting a CDMA signal via the uplink channel using the one or more parameters based on transmitting the first indication that the UE supports the CDMA transmissions that use the uplink channel.

A non-transitory computer-readable medium storing code for wireless communication at a UE is described. The code may include instructions executable by a processor to transmit, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, receive a second indication of one or more parameters for the CDMA transmissions that use the uplink channel, and transmit a CDMA signal via the uplink channel using the one or more parameters based on transmitting the first indication that the UE supports the CDMA transmissions that use the uplink channel.

Some examples of the method, apparatuses, and non-transitory computer-readable medium described herein may further include operations, features, means, or instructions for receiving, from the network entity, a third indication that the uplink channel supports the CDMA transmissions, where transmitting the CDMA signal may be based on receiving the third indication.

Some examples of the method, apparatuses, and non-transitory computer-readable medium described herein may further include operations, features, means, or instructions for receiving, from the network entity, a third indication restricting the CDMA transmissions via the uplink channel and refraining from transmitting a second CDMA signal based on the third indication, where transmitting the CDMA signal may be based on transmission of the CDMA signal occurring before receiving the third indication.

In some examples of the method, apparatuses, and non-transitory computer-readable medium described herein, transmitting the CDMA signal may include operations, features, means, or instructions for transmitting a random access preamble via a random access channel (RACH) and transmitting, via the RACH, a capsule including a data transmission associated with the random access preamble, where the UE transmits the capsule during a time period that may be based on a propagation delay of transmissions between the UE and the network entity.

In some examples of the method, apparatuses, and non-transitory computer-readable medium described herein, the propagation delay may be based on a reference signal received power (RSRP) measurement.

In some examples of the method, apparatuses, and non-transitory computer-readable medium described herein, a length of the random access preamble may be based on the propagation delay.

In some examples of the method, apparatuses, and non-transitory computer-readable medium described herein, transmitting the CDMA signal may include operations, features, means, or instructions for transmitting, via a data channel, data at a time offset from a RACH transmission, where the time offset may be based on a propagation delay of transmissions between the UE and the network entity.

Some examples of the method, apparatuses, and non-transitory computer-readable medium described herein may further include operations, features, means, or instructions for transmitting, via the data channel and prior to transmission of the data, a preamble associated with the data, where the preamble may be used to re-synchronize uplink transmissions from the UE to the network entity.

Some examples of the method, apparatuses, and non-transitory computer-readable medium described herein may further include operations, features, means, or instructions for receiving a third indication of a timing adjustment from the network entity and transitioning from transmitting a CDMA waveform via the uplink channel to transmitting an OFDM waveform via the uplink channel based on receiving the third indication.

Some examples of the method, apparatuses, and non-transitory computer-readable medium described herein may further include operations, features, means, or instructions for uplink transmissions from the UE to the network entity may be asynchronous transmissions.

In some examples of the method, apparatuses, and non-transitory computer-readable medium described herein, the uplink channel includes a set of multiple CDMA sub-channels, the set of multiple CDMA sub-channels based on the one or more parameters for the CDMA transmissions.

In some examples of the method, apparatuses, and non-transitory computer-readable medium described herein, the UE and the network entity communicate via a non-terrestrial network (NTN).

A method for wireless communication at a network entity is described. The method may include receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, transmitting a second indication of one or more parameters for the CDMA transmissions that use the uplink channel, and receiving a CDMA signal via the uplink channel using the one or more parameters based on receiving the first indication that the UE supports the CDMA transmissions that use the uplink channel.

An apparatus for wireless communication at a network entity is described. The apparatus may include a processor, memory coupled with the processor, and instructions stored in the memory. The instructions may be executable by the processor to cause the apparatus to receive, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, transmit a second indication of one or more parameters for the CDMA transmissions that use the uplink channel, and receive a CDMA signal via the uplink channel using the one or more parameters based on receiving the first indication that the UE supports the CDMA transmissions that use the uplink channel.

Another apparatus for wireless communication at a network entity is described. The apparatus may include means for receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, means for transmitting a second indication of one or more parameters for the CDMA transmissions that use the uplink channel, and means for receiving a CDMA signal via the uplink channel using the one or more parameters based on receiving the first indication that the UE supports the CDMA transmissions that use the uplink channel.

A non-transitory computer-readable medium storing code for wireless communication at a network entity is described. The code may include instructions executable by a processor to receive, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions, transmit a second indication of one or more parameters for the CDMA transmissions that use the uplink channel, and receive a CDMA signal via the uplink channel using the one or more parameters based on receiving the first indication that the UE supports the CDMA transmissions that use the uplink channel.

Some examples of the method, apparatuses, and non-transitory computer-readable medium described herein may further include operations, features, means, or instructions for determining whether a received power level of the uplink channel satisfies a threshold power level and transmitting a third indication that the uplink channel supports the CDMA transmissions based on determining that the received power level fails to satisfy the threshold power level, where receiving the CDMA signal may be based on transmitting the third indication.

Some examples of the method, apparatuses, and non-transitory computer-readable medium described herein may further include operations, features, means, or instructions for determining whether a received power level of the uplink channel satisfies a threshold power level and transmitting, for the UE, a third indication restricting the CDMA transmissions via the uplink channel based on determining that the received power level of the uplink channel satisfies the threshold power level.

Some examples of the method, apparatuses, and non-transitory computer-readable medium described herein may further include operations, features, means, or instructions for determining whether the received power level of the uplink channel satisfies the threshold power level based on a capability of a receiver of the network entity to detect and cancel interference, where the threshold power level may be based on the capability of the receiver of the network entity.

In some examples of the method, apparatuses, and non-transitory computer-readable medium described herein, receiving the CDMA signal may include operations, features, means, or instructions for receiving, via a RACH, a random access preamble associated with the UE and receiving, via the RACH, a capsule including a data transmission associated with the random access preamble, where the network entity receives the capsule during a time period that may be based on a propagation delay of transmissions between the UE and the network entity.

In some examples of the method, apparatuses, and non-transitory computer-readable medium described herein, the propagation delay may be based on a RSRP measurement.

In some examples of the method, apparatuses, and non-transitory computer-readable medium described herein, a length of the random access preamble may be based on the propagation delay.

Some examples of the method, apparatuses, and non-transitory computer-readable medium described herein may further include operations, features, means, or instructions for receiving, via a data channel, data at a time offset from a RACH transmission, where the time offset may be based on a propagation delay of transmissions between the UE and the network entity.

Some examples of the method, apparatuses, and non-transitory computer-readable medium described herein may further include operations, features, means, or instructions for receiving, via the data channel and prior to reception of the data, a preamble associated with the data, where the preamble may be used to re-synchronize uplink transmissions from the UE to the network entity.

Some examples of the method, apparatuses, and non-transitory computer-readable medium described herein may further include operations, features, means, or instructions for transmitting a third indication of a timing adjustment for the UE and receiving, via the uplink channel, a signal associated with the UE, the signal including an OFDM waveform based on the third indication of the timing adjustment.

Some examples of the method, apparatuses, and non-transitory computer-readable medium described herein may further include operations, features, means, or instructions for receiving, via the uplink channel, signaling that includes the CDMA signal and an OFDM signal, where receiving the CDMA signal may be based on processing the signaling.

In some examples of the method, apparatuses, and non-transitory computer-readable medium described herein, the uplink channel includes a set of multiple CDMA sub-channels, the set of multiple CDMA sub-channels based on the one or more parameters for the CDMA transmissions.

Some examples of the method, apparatuses, and non-transitory computer-readable medium described herein may further include operations, features, means, or instructions for uplink transmissions from the UE to the network entity may be asynchronous transmissions and downlink transmissions from the network entity to the UE may be synchronous transmissions.

In some examples of the method, apparatuses, and non-transitory computer-readable medium described herein, the UE and the network entity communicate via an NTN.

DETAILED DESCRIPTION

Figure 1:
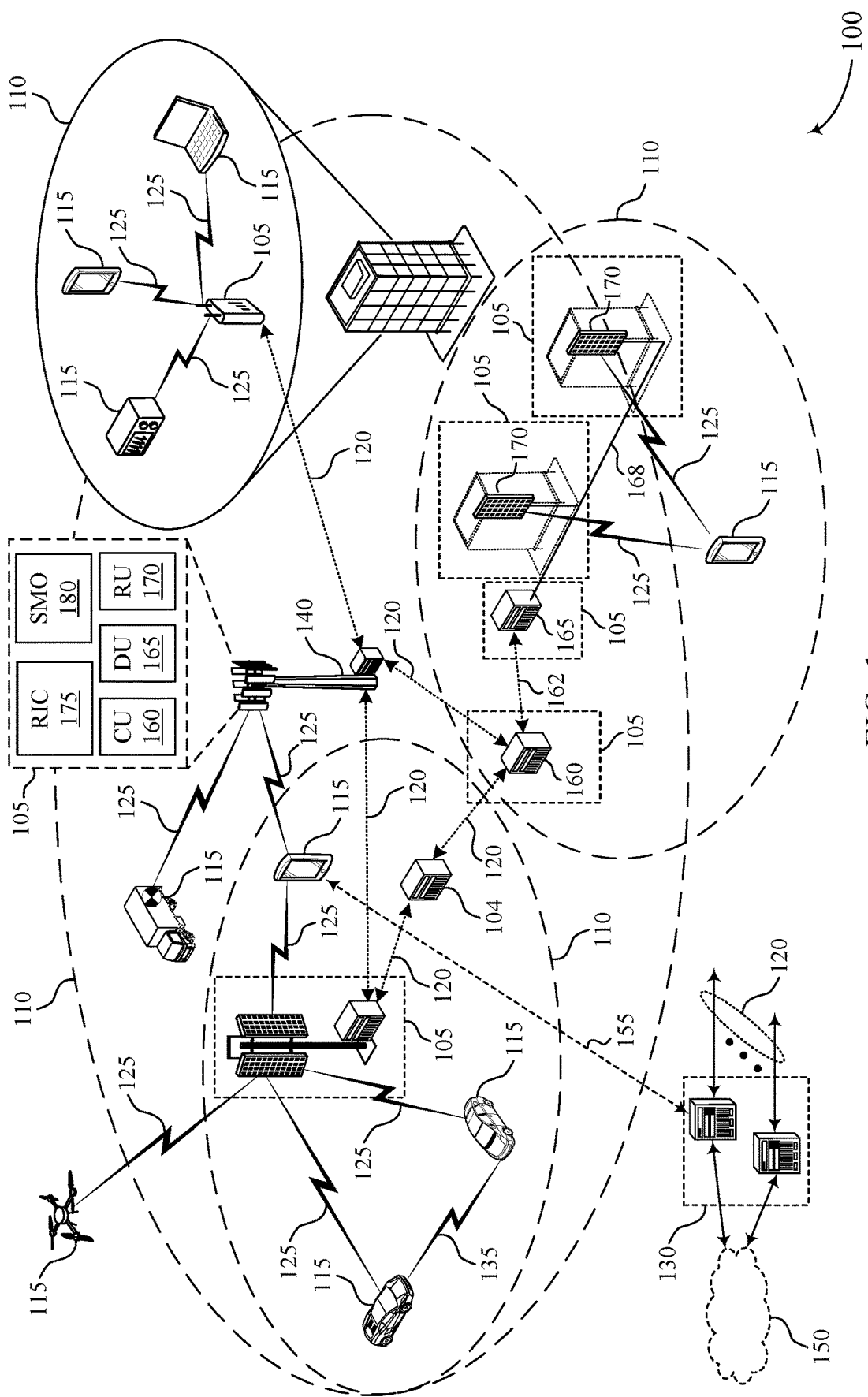
FIG. 1 illustrates an example of a wireless communications system that supports concurrent code division and frequency division signaling via an uplink channel in accordance with one or more aspects of the present disclosure.

In some implementations or networks (e.g., in a non-terrestrial network), a propagation delay may exist between a user equipment (UE) and a network entity. The UE may communicate with a network entity using orthogonal frequency division multiplexing (OFDM) based waveforms (e.g., orthogonal frequency division multiple access (OFDMA) signaling). Coding of OFDM waveforms may use synchronization between the UE and the network entity in order to preserve an orthogonality of the waveform. Such synchronization may be supported by a global navigation satellite system (GNSS) because the GNSS may provide accurate positioning information, which may be used to calculate a timing advance for performing uplink transmissions. As such, UEs in a coverage area of the network entity may remain synchronized with the network entity. For example, a UE located further away from the network entity (e.g., on the cell edge) may determine a larger timing advance than a UE located closer to the network entity (e.g., in order to preserve synchronization, or a similar timing, for signals received at the network entity).

In some cases, a UE may not have a capability to use GNSS (e.g., may be a low-tier UE), may have GNSS turned off (e.g., to conserve power), may be unable to access a GNSS service (e.g., due to a location of the UE), or may otherwise be unable to use GNSS. Without GNSS, the UE may not achieve uplink synchronization at the receiver of the network entity (e.g., for network entities located relatively far from the UE), thus breaking the orthogonality of the OFDM waveform. In such cases, communication methods that use synchronization between devices (e.g., OFDM waveforms) may experience reduced reliability, reduced communication quality, increase interference between transmissions, or any combination thereof.

The techniques, methods, and apparatuses described herein provide for the UE to perform asynchronous communications using a code division multiple access (CDMA) based waveform, such that the UE may communicate with a network entity (e.g., non-terrestrial or terrestrial network entity) without using GNSS. The UE may indicate to the network entity a capability for communicating with CDMA waveforms and may use CDMA waveforms based on transmitting the indication. The UE may also receive one or more parameters associated with using the CDMA waveforms, such as via system information, and may use CDMA waveforms based on the one or more parameters. The CDMA waveforms may be transmitted via an uplink channel, which may be shared with OFDM waveforms (e.g., transmitted by one or more other UEs).

In some cases, the uplink channel for CDMA transmissions may be divided into CDMA sub channels for the CDMA transmissions. In some cases, a UE communicating using CDMA waveforms may create interference for other UEs in the network communicating without CDMA (e.g., using OFDM waveforms). As such, the network entity may monitor the interference, or load, of the system and may indicate to the UE to stop using CDMA waveforms if the load exceeds a threshold. The uplink channel may be a random access channel (RACH) and may support RACH transmissions, or may be a data channel and support data transmissions. In some cases, the UE may transition from CDMA to OFDMA transmissions after establishing a timing adjustment with the network.

Aspects of the disclosure are initially described in the context of wireless communications systems. An additional wireless communication system, channel configurations, and process flow are the provided to describe aspects of the disclosure. Aspects of the disclosure are further illustrated by and described with reference to apparatus diagrams, system diagrams, and flowcharts that relate to concurrent code division and frequency division signaling via an uplink channel.

FIG. 1 illustrates an example of a wireless communications system 100 that supports concurrent code division and frequency division signaling via an uplink channel in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support concurrent code division and frequency division signaling via an uplink channel as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some implementations, a non-terrestrial network entity (e.g., satellite) may be an example of the network entity 105. A propagation delay may exist between the UE 115 and the network entity 105 (e.g., for a non-terrestrial network, or other network). In some cases, a non-terrestrial network may be used for transmission of small data services, such as text messaging (e.g., emergency messaging) for UEs 115 out of terrestrial network coverage, or IoT traffic.

In some examples, a propagation delay between the UE 115 and a non-terrestrial network entity 105 (e.g., or other network entity 105) may span several milliseconds, while a propagation delay between the UE 115 and a terrestrial network entity 105 may be one or more microseconds (e.g., on the order of magnitude of microseconds). The UE 115 may communicate with a network entity using OFDM based waveforms (e.g., OFDMA signaling), which may include precoding the waveform using DFT-S-OFDM. Such OFDM coding may use synchronization across UEs 115 (e.g., synchronization between the UEs 115 and the network entity 105) within a coverage area 110 of the respective network entity 105 in order to preserve the orthogonality of the waveform.

Such synchronization may be supported by GNSS because GNSS may provide accurate positioning information, which may be used to calculate a timing advance for performing uplink transmissions. As such, the UEs 115 in the coverage area 110 may remain synchronized with the respective network entity 105. For example, a UE 115 located further away from the network entity 105 (e.g., on the cell edge) may determine a larger timing advance than a UE 115 located closer to the network entity 105 (e.g., in order to preserve synchronization, such as a similar timing, for signals received at the network entity 105).

In some cases, a UE 115 may not have a capability to use GNSS (e.g., may be a low-tier UE 115), may have GNSS turned off (e.g., to conserve power), may be unable to access a GNSS service (e.g., due to a location of the UE 115), or may otherwise be unable to use GNSS, among other examples. Without GNSS, it may be difficult for the UE 115 to achieve uplink synchronization at the receiver (e.g., for network entities 105 located relatively far from the UE 115), thus breaking the orthogonality of the waveform. In such cases, communication methods that use synchronization between devices (e.g., OFDM waveforms) may experience reduced reliability, reduced communication quality, increase interference between transmissions, or any combination thereof.

In order to support asynchronous transmissions, a UE 115 may transmit an uplink communication using a CDMA waveform, which may be transmitted without the UE 115 being synchronized with a network entity 105. The UE 115 may transmit the CDMA waveform via an uplink channel shared with UEs 115 performing OFDM transmissions. In some cases, the uplink channel for CDMA transmissions may be divided into CDMA sub channels for the CDMA transmissions. In some cases, uplink transmissions using CDMA may cause interference for OFDMA uplink transmissions, and the network entity 105 may monitor the load of the system using one or more metrics. If the load (e.g., interference caused by the UEs 115 using CDMA) of the system exceeds a threshold, the network entity 105 may restrict CDMA transmissions on the uplink channel. The uplink channel may be a RACH and may support RACH transmissions, or may be a data channel and support data transmissions. In some cases, the UE 115 may transition from CDMA to OFDMA transmissions after establishing a timing adjustment with the network.

Figure 2:
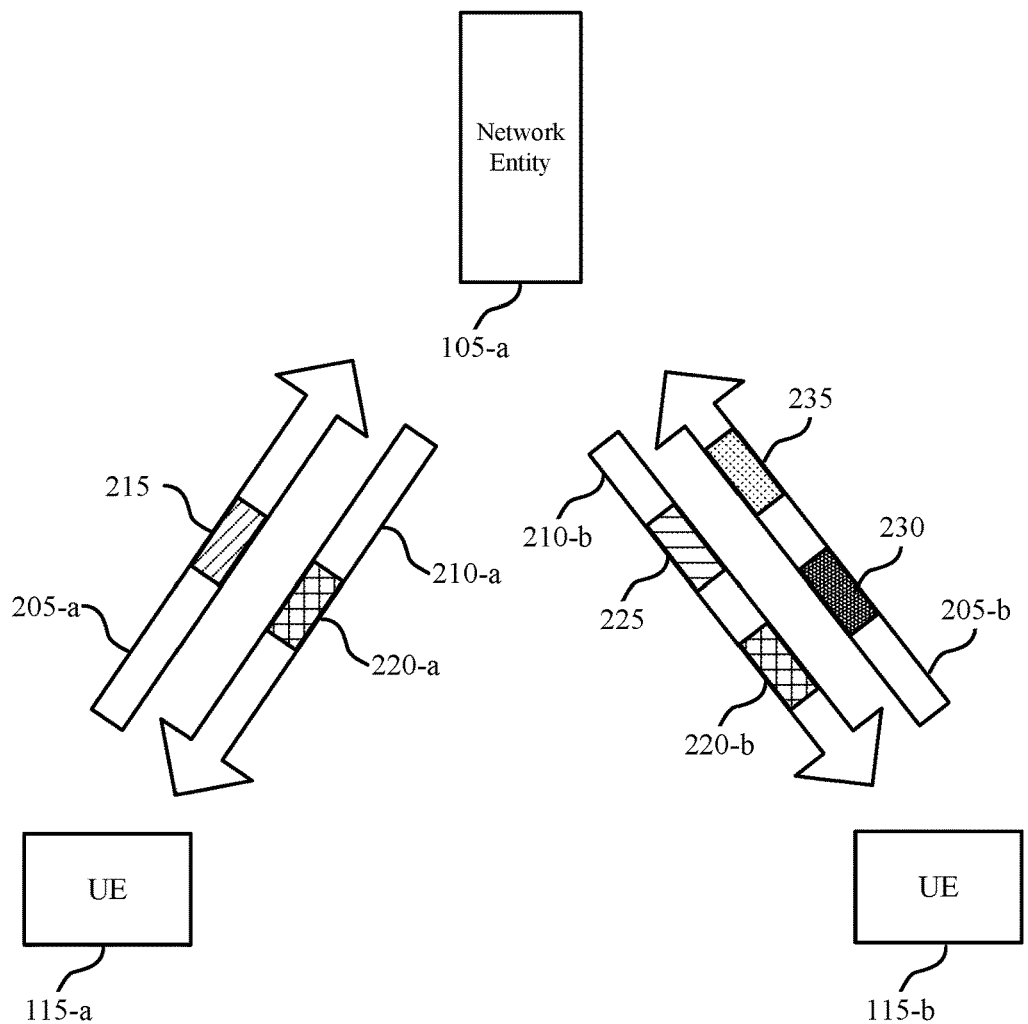
FIG. 2 illustrates an example of a wireless communications system that supports concurrent code division and frequency division signaling via an uplink channel in accordance with one or more aspects of the present disclosure.

FIG. 2 illustrates an example of a wireless communications system 200 that supports concurrent code division and frequency division signaling via an uplink channel in accordance with one or more aspects of the present disclosure. In some examples, wireless communications system 200 may be implemented by one or more aspects of wireless communications system 100. For instance, a UE 115-a and a UE 115-b may each be an example of a UE 115 as described with reference to FIG. 1. Additionally or alternatively, a network entity 105-a (e.g., a non-terrestrial network entity 105, another type of network entity 105) may be an example a network entity 105 as described with reference to FIG. 1. UE 115-a may communicate with network entity 105-a over an uplink communication link 205-a and a downlink communication link 210-a using OFDM waveforms. Similarly, UE 115-b may communicate with network entity 105-a over an uplink communication link 205-b using CDMA waveforms and a downlink communication link 210-b using OFDM waveforms. Network entity 105-a may transmit downlink messages 220 to UE 115-a and UE 115-b using OFDM waveforms.

In some examples, UE 115-a may operate with GNSS while UE 115-b may operate without GNSS, such that UE 115-b to be unable to synchronize with network entity 105-a. As such, UE 115-a may perform uplink communications via an uplink channel using a single carrier or other OFDM waveform (e.g., including DFT-s-OFDM), while UE 115-b may perform uplink communications via the uplink channel using a CDMA waveform because CDMA waveforms may be multiplexed without synchronization (e.g., without full or complete synchronization). The uplink channel may be configured for one or more CDMA transmissions from a first set of UEs 115 (e.g., including UE 115-b) and one or more OFDMA transmissions from a second set of UEs 115 (e.g., including UE 115-a). For example, UE 115-a and UE 115-b may share the same channel and UE 115-a and UE 115-b may concurrently (e.g., at least partially concurrently) communicate with network entity 105-a. For example, an uplink message 230 transmitted using a CDMA waveform by UE 115-b may not affect, or may have relatively small effect on, an uplink message 215 transmitted using an OFDM waveform via the same channel by UE 115-a.

UE 115-a may establish a connection with network entity 105-a by transmitting an uplink message 215 using an OFDM waveform. Network entity 105-a may synchronize with UE 115-a based on the uplink message 215 and transmit a downlink message 220-a on an OFDM waveform.

Prior to communicating using a CDMA signal, UE 115-b may transmit a capability message 235 to network entity 105-a using an OFDMA signal. The capability message 235 may indicate that UE 115-b supports CDMA transmissions that use an uplink channel shared with OFDMA transmissions. In some cases, network entity 105-a may respond to the received capability message 235 by transmitting one or more parameters (e.g., a CDMA code or channel allocation) for CDMA transmissions that use the uplink channel, such as via a downlink message 220-b. Additionally or alternatively, UE 115-b may receive the one or more parameters as part of system information (e.g., from network entity 105-a or another network entity 105) before transmitting the capability message 235. UE 115-b may transmit a CDMA uplink message 230 via the uplink channel using the one or more parameters, based on transmitting the capability message 235 that indicates that UE 115-b supports CDMA uplink transmissions that use the uplink channel (e.g., after transmitting the capability message 235).

In some cases, sharing the uplink channel between CDMA transmissions and OFDM transmissions (e.g., OFDMA transmissions) may cause the uplink message 230 transmitted by UE 115-b using a CDMA waveform to interfere with an uplink message 215 transmitted by UE 115-a using an OFDM waveform (e.g., or to interfere with another OFDM-based uplink message from another UE 15). To mitigate or reduce such interference, network entity 105-a may monitor a load (e.g., traffic, received power) of the uplink channel and may determine whether the uplink channel supports CDMA transmissions (e.g., in addition to OFDMA transmissions). Based on such a determination, network entity 105-a may indicate to UE 115-b to transmit or refrain from transmitting using CDMA waveforms, via a load indication 225. In some implementations, UE 115-b may receive, from network entity 105-a, the load indication 225 that indicates that the uplink channel supports CDMA transmissions. In such cases, UE 115-b may transmit the uplink message 230 based on receiving the load indication 225. In other implementations, UE 115-b may receive, from network entity 105-a, the load indication 225 restricting CDMA transmissions via the uplink channel (e.g., the load indication may be set). In such cases, UE 115-b may refrain from transmitting a CDMA signal via the uplink channel based on the load indication 225.

In some cases, the uplink message 230 may include a RACH preamble identifying UE 115-b and may also include data (e.g., a capsule) associated with the preamble. In some cases, UE 115-b may transmit the preamble and data together (e.g., with a short separation time between the transmission of the preamble and the data) as part of a first message of a RACH procedure. Network entity 105-a may determine a search window size from the received preamble and transmit a downlink message 220-b in response to UE 115-b. In some cases, UE 115-b may additionally or alternatively transmit data via the uplink message 230 using a data channel. For example, UE 115-b may transmit the data during a time period based on a propagation delay of transmissions between UE 115-b and network entity 105-a.

In some cases, network entity 105-a may determine a timing adjustment for UE 115-b and transmit the timing adjustment to UE 115-b via the downlink communication link 210-b. For example, based on detection of the use of CDMA waveforms via the data channel or based on the capability message 235, network entity 105-a may communicate with one or more UEs 115 using CDMA waveforms and may determine a round trip delay for each UE 115 communicating using CDMA waveforms. In some cases, the timing adjustment may include an absolute adjustment (e.g., for achieving fast but coarse timing adjustments), a relative adjustment (e.g., for achieving slow but fine timing adjustments), or both. Network entity 105-a may transmit an indication of the timing adjustment to the UE(s) 115, such as UE 115-b.

UE 115-b may use the received timing adjustment to establish accurate timing with network entity 105-a, thereby supporting synchronization with network entity 105-a. As such, UE 115-b may, in some cases, establish synchronization with network entity 105-a and transmit an uplink message to network entity 105-a using an OFDM waveform instead of a CDMA waveform (e.g., UE 115-b may determine to send an OFDM waveform after synchronizing). In some cases, network entity 105-b may transmit a closed loop command (e.g., indication of a timing adjustment) to UE 115-b after a connection has been established (e.g., after handshake), which may indicate for UE 115-b to transition from transmitting using a CDMA waveform to transmitting using an OFDM waveform. In some examples, UE 115-b may transmit a small payload, or other relatively small or short messaging, using a CDMA waveform before transitioning to an OFDM waveform (e.g., after synchronizing with the network). Such transitions may support management of load and interference of the uplink channel by network entity 105-a (e.g., by transitioning UEs 115 to OFDM waveforms such that a relatively low quantity of UEs 115 use CDMA waveforms).

In some cases, network entity 105-a may include a receiver for processing mixed waveforms. For example, network entity 105-a may concurrently or sequentially process OFDM waveforms received from UE 115-a using the receiver and CDMA waveforms received from UE 115-b using the receiver. In one implementation, the receiver may remove the cyclic prefix of the OFDM waveform and perform a fast Fourier transform (FFT) on the entire bandwidth of the waveform. The receiver may select a sub-band for forming an M'ary vector based on the FFT, and may perform an inverse discrete Fourier transform (IDFT) on the M'ary vector and decode the data from the resulting transform. Separately or concurrently, the receiver may filter a CDMA waveform using a lowpass filter. The receiver may process the filtered waveform in the time domain (e.g., remove pulse shaping) and decode the data from the resulting waveform.

Figure 3A:
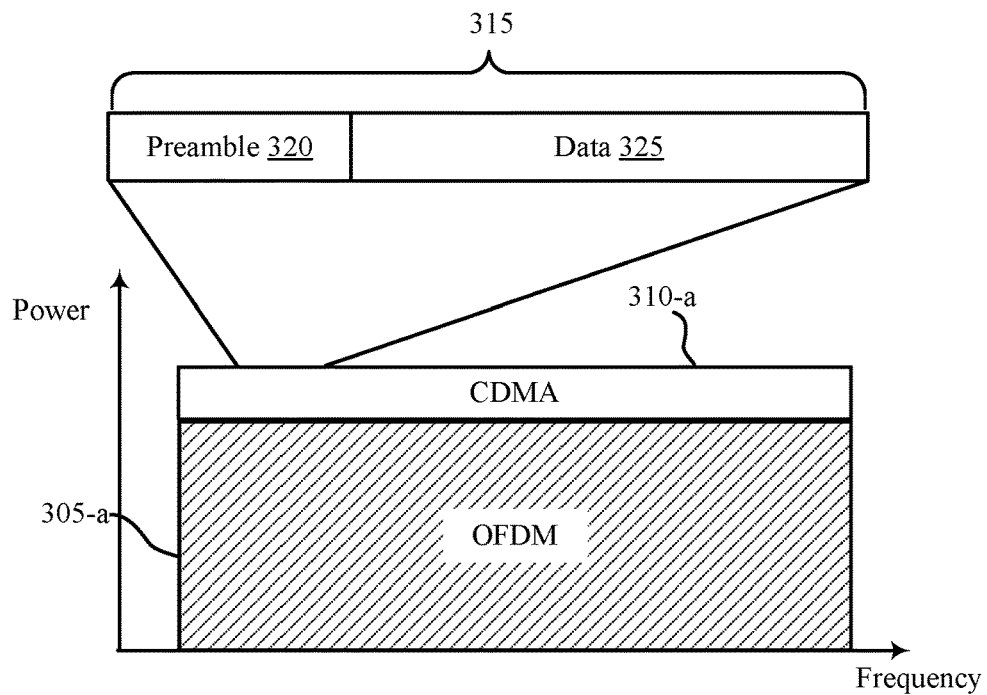
FIGS. 3A and 3B illustrate examples of channel configurations that support concurrent code division and frequency division signaling via an uplink channel in accordance with one or more aspects of the present disclosure.
Figure 3B:
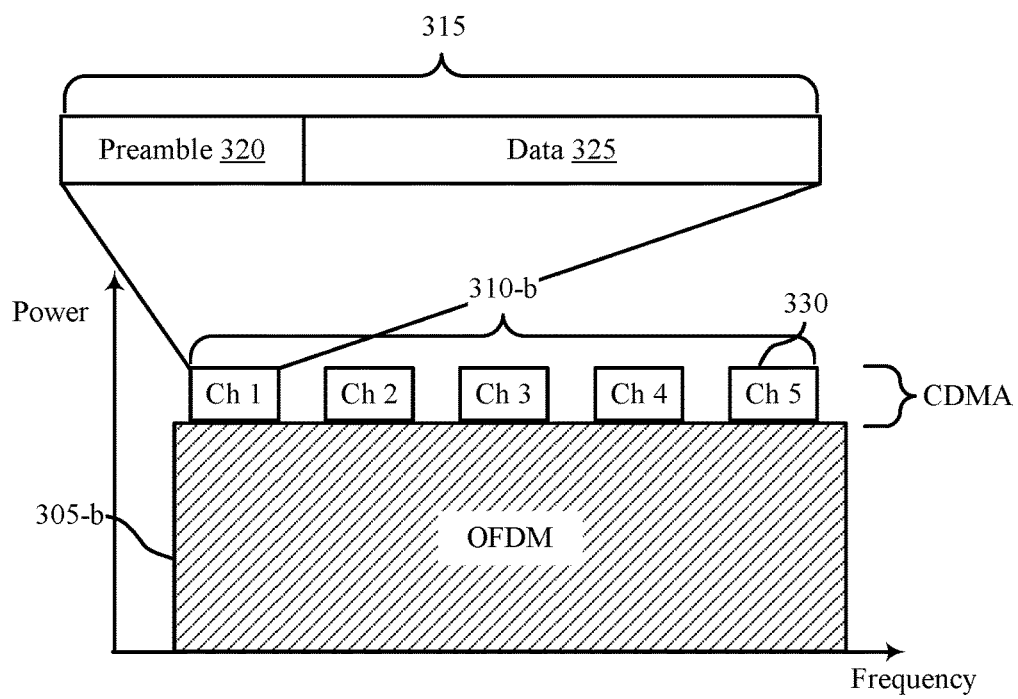

FIGS. 3A and 3B illustrate examples of channel configurations 300 and 350 that support concurrent code division and frequency division signaling via an uplink channel in accordance with one or more aspects of the present disclosure. In some examples, channel configurations 300 and/or 350 may implement or be implemented by one or more aspects of wireless communications system 100 or 200. For instance, the channel configurations 300 and/or 350 may be for an uplink channel shared by different UEs 115 that use OFDM waveforms and CDMA waveforms, respectively, as described with reference to FIGS. 1 and 2. The uplink channel may include an OFDM uplink channel 305 and a CDMA uplink channel 310. FIGS. 3A and 3B show the respective OFDM uplink channel 305 and CDMA uplink channel 310 as a function of frequency and power. The OFDM uplink channel 305 may use more power than CDMA uplink channel 310 because UEs 115 using OFDM waveforms may have a higher data throughput and may use more power (e.g., based on the higher data throughput, based on one or more other parameters). UEs 115 using CDMA waveforms may transmit at a lower data rate, and thus may use less power than a UE operating with OFDM.

In channel configuration 300, a CDMA uplink channel 310-a and an OFDM uplink channel 305-a may each span the bandwidth of the uplink channel. In channel configuration 350 (e.g., based on a total channel bandwidth), a CDMA uplink channel 310-b may be broken into multiple sub channels 330 (e.g., within the bandwidth of the uplink channel), while an OFDM uplink channel 305-b may span the bandwidth of the uplink channel.

In some cases, a network entity 105 may service UEs 115 using OFDM waveforms for uplink transmissions and UEs 115 using CDMA waveforms for uplink transmissions. The UEs 115 using CDMA may share the same uplink channel with the UEs 115 using OFDM. In some cases, sharing the uplink channel may cause interference in uplink transmissions (e.g., the CDMA transmissions may cause interference for the OFDM transmissions). Accordingly, the network entity 105 may monitor an overall load of a CDMA uplink channel 310 or sub channel 330, where the load may refer to a received power of the CDMA uplink channel 310 (e.g., at the network entity 105).

For example, the network entity 105 may analyze the interference for a CDMA uplink channel 310-a or 310-b, or for a frequency segment of OFDM uplink channel 305 in which a single OFDM user may be active. In some cases, the network entity 105 may monitor the load and/or interference of the CDMA uplink channel 310 using a rise over thermal (RoT) metric. RoT may be defined as a total power in a receiver of the network entity 105 (e.g., received by the receiver) divided by a thermal noise power (e.g., noise power in the receiver). The thermal level may depend on temperature and the temperature of a non-terrestrial network entity 105 (e.g., satellite) may change by relatively high quantities based on received power. Therefore an open-loop power control may inform the network entity 105 of the thermal noise (e.g., changing thermal noise). As such, in some cases, the network entity 105 may observe RoT more reliably than the load of the uplink channel because multiple factors may contribute to the load, but the network entity 105 may not be able to identify some of the factors. Therefore, RoT may be associated with, or indicate, a stability of the uplink channel or the load of the uplink channel. If the uplink channel exceeds a load threshold (e.g., an RoT threshold) the system may become unstable and/or interference (e.g., CDMA generated interference) may become unmanageable (e.g., relatively difficult to manage by the network entity 105).

For example, if the uplink channel experiences relatively high levels of interference (e.g., from CDMA transmissions) the transmitting UEs 115 may attempt to transmit with a higher power so that uplink signaling may be received successfully by the network entity 105. However, as each UE 115 increases transmit power the interference may also increase. Thus, to take action to reduce or manage interference levels, the network entity 105 may monitor the RoT to attempt to maintain the power level of the channel below a threshold (e.g., ensure that the power level does not exceed a threshold).

In some cases, a link budget may constrain the RoT threshold and impact potential incoming users. Additionally or alternatively, a target signal to interference noise ratio (SINR) of a CDMA user may fluctuate due to imperfect power control, which may cause the RoT to also fluctuate. Such fluctuations may amplify with a high RoT. However, for a single CDMA or OFDM UE 115 (e.g., a single UE 115 transmitting within a bandwidth) a high RoT may be allowed. As such, the network entity 105 may allow a high RoT if a single UE 115 (e.g., either CDMA or OFDM) is present (e.g., transmitting) within a bandwidth (e.g., a sub channel 330, or a portion of the uplink channel).

As described herein, the network entity 105 may monitor the RoT to determine if the RoT exceeds the threshold for the system (e.g., for the uplink channel). In some cases, if the RoT is above the threshold (e.g., satisfies the threshold) for CDMA uplink channel 310-*a*, or one or more sub channels 330 of CDMA uplink channel 310-*b*, the network entity 105 may broadcast an overload indication to each UE 115 (e.g., to each UE 115 associated with the uplink channel, to each UE 115 using CDMA transmissions). In some examples, UEs 115 using CDMA waveforms may monitor for the overload indication from the network entity 105. These UEs 115 may transmit using CDMA waveforms over the CDMA uplink channel 310 if the overload indication is not set (e.g., not transmitted by the network entity 105).

In some cases, the network entity 105 may periodically broadcast an RoT indication message over downlink communication channels, which may indicate whether a respective CDMA uplink channel 310 is available for CDMA transmissions. For example, the network entity 105 may broadcast an indication message indicating that a CDMA uplink channel 310 is not available for CDMA transmissions. In such cases, the UEs 115 using CDMA waveforms may refrain from transmitting using the CDMA uplink channel 310 and may wait to transmit until the RoT is below the threshold. In some cases, the network entity may broadcast an indication message indicating that a CDMA uplink channel 310 is available for CDMA transmissions (e.g., after previously indicating that the CDMA uplink channel 310 is not available). In such cases, the UEs 115 using CDMA waveforms may transmit via the CDMA uplink channel 310 based on the indication message.

In some cases, UEs 115 using OFDM waveforms may have higher priority than UEs 115 using CDMA waveforms, for example, because a UE 115 using OFDM in a frequency segment may have a relatively higher transmit power than a UE 115 using CDMA (e.g., and may also have a higher data throughput). In some cases, the network entity 105 may be equipped with an advanced receiver, such as a receiver that support interference cancellation and may thereby support removal of interference from CDMA transmissions for OFDM transmissions. Such a receiver may support increased performance, for example, by supporting removal of CDMA interference (e.g., which may support a higher RoT threshold for the uplink channel). Because OFDM waveforms may be associated with a higher receive power, the network entity 105 may first decode received OFDM waveforms and cancel these waveforms from a received signal (e.g., using the interference cancellation capability). After removing the OFDM waveforms from a signal, CDMA waveforms of the signal may be processed by the receiver (e.g., after OFDM interference is cancelled by the receiver).

In one implementation, a CDMA uplink channel 310 may be used for RACH transmissions from one or more UEs 115 to the network entity 105. A CDMA uplink channel 310 may, for example, support RACH channel transmissions because the CDMA uplink channel 310 may support asynchronous transmissions. If the CDMA uplink channel 310 is used for RACH transmissions, a UE 115 may transmit, via the CDMA uplink channel 310, a RACH preamble 320 and data 325 as part of a first message 315 of a two-step RACH procedure (e.g., which may be similar to a message A (msgA)). The length of the RACH preamble 320 may, in some cases, be configured to accommodate a longest delay of a service link between the UE 115 and the network entity 105 (e.g., longest propagation delay, a worst-case delay). For example, over a series of uplink transmissions, the longest delay may be the longest time delay between the UE 115 and the network entity 105 for the series of transmissions, or may be the longest time delay for the series of transmissions plus an offset or buffer. Additionally or alternatively, each UE 115 serviced by the network entity 105 and using CDMA waveforms may experience a delay in uplink transmissions, and the longest delay of the service link may be the longest time delay out of all the UEs 115 using CDMA waveforms.

Multiple preamble formats (e.g., preamble bandwidth, duration) may be defined to accommodate various service link delays (e.g., delays within an non-terrestrial network), and in some cases, the network entity 105 may select one of the multiple preamble formats based on the longest delay. In some cases, the propagation delay may be estimated a reference signal received power (RSRP) measurement, and the length of the RACH preamble 320 may be based on the propagation delay. Based on the estimated propagation delay, the network entity 105 may adjust one or more timings to reduce differences in receive time between uplink signals from UEs 115 using CDMA waveforms.

The UE may transmit the data 325 associated with the RACH preamble 320 in a capsule of the first message 315. In some cases, the data 325 may all be transmitted within the capsule of the first message 315. In some other cases, the UE 115 may transmit a first portion of the data 325 via the capsule and a second portion of the data 325 via a high level data channel, for example, if the data 325 exceeds a capsule size.

Multiple capsule formats (e.g., capsule modulation coding scheme (MCS), duration) may be configured to accommodate various data rates for the capsule. Further, the UE 115 may include a UE identifier in the capsule (e.g., within the data 325). In some cases, the UE 115 may scramble the RACH preamble 320 and the data 325 with a same pseudo random code (e.g., CDMA code). A mask of the pseudo random code may be a function of a cell identifier, slot number, or other value. After transmitting the first message 315, the UE 115 may monitor for a random access response from the network entity 105. Accordingly, the network entity may receive the first message 315 and determine a search window for monitoring for the data 325 based on the received RACH preamble 320. A search window for the random access response may be based on a longest delay of the service link (e.g., the search window duration may be longer than a longest round trip delay), and the UE 115 may monitor for a random access response message from the network entity 105 via an OFDM downlink channel.

In another implementation, the CDMA uplink channel 310 may be used for a data channel (e.g., the UE 115 may transmit an uplink message 315 via the data channel). The UE 115 may transmit the message 315 via the data channel with a fixed time offset (e.g., defined as a system level parameter) from the transmission of a RACH channel. In such cases, the fixed offset may accommodate the longest round trip delay of the service link as described herein. The UE 115 may transmit the message 315 via the data channel if the UE 115 receives an acknowledge message to the RACH channel transmission (e.g., a random access response). In some cases, the UE may transmit a relatively small preamble 320 before (e.g., immediately before) the start of the data channel (e.g., transmission of data 325), where the preamble 320 may support the receiver at the network entity 105 re-synchronizing with the uplink timing of the UE 115. The re-synchronization may reduce or mitigate timing delays that may arise during a gap between transmission due to environmental factors (e.g., a service link Doppler).

Figure 4:
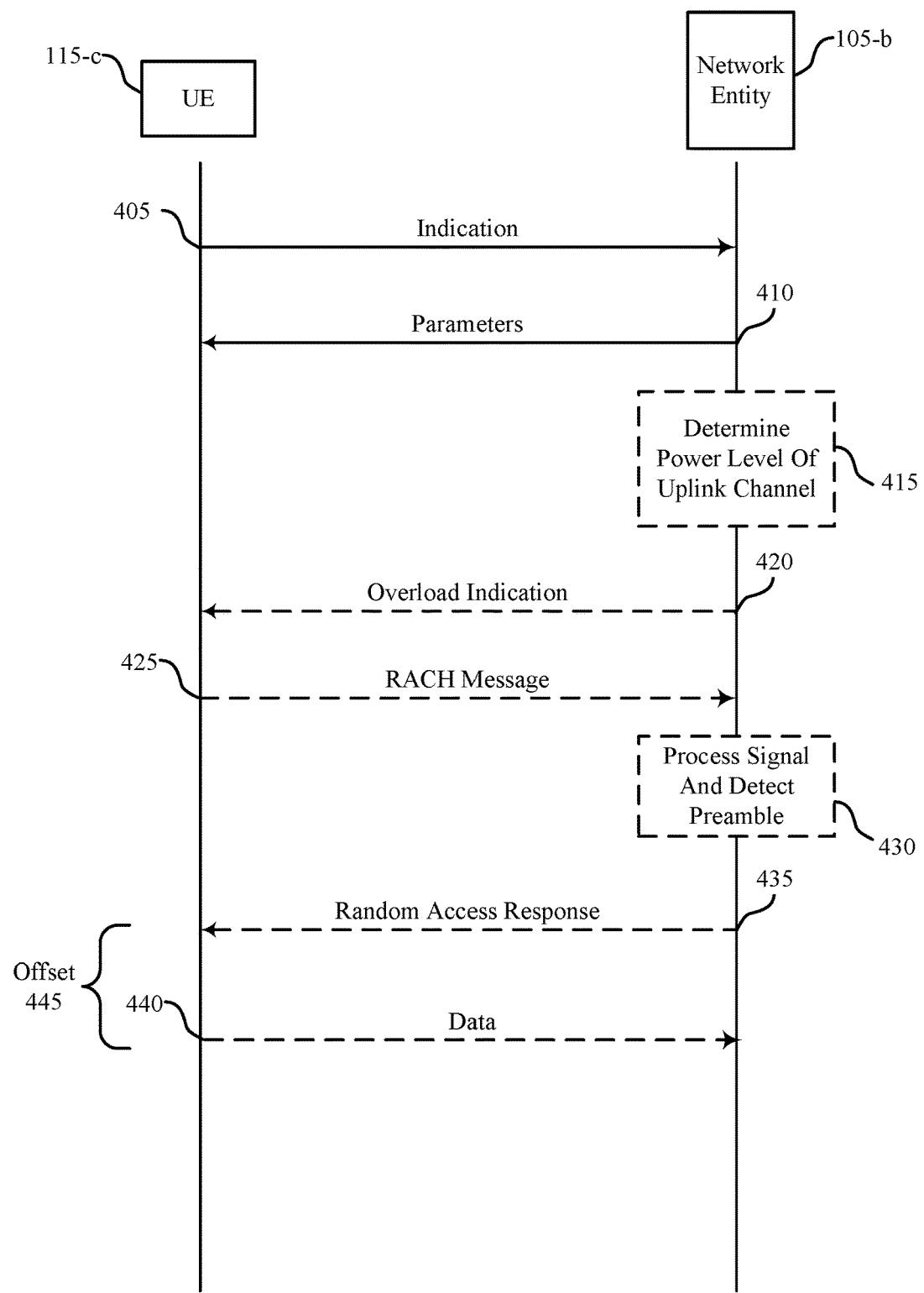
FIG. 4 illustrates an example of a process flow that supports concurrent code division and frequency division signaling via an uplink channel in accordance with one or more aspects of the present disclosure.

FIG. 4 illustrates an example of a process flow 400 that supports concurrent code division and frequency division signaling via an uplink channel in accordance with one or more aspects of the present disclosure. In some examples, process flow 400 may implement or be implemented by one or more aspects of wireless communications system 100 and 200 as described with reference to FIGS. 1 and 2, or channel configurations 300 and 350 described with reference to FIGS. 3A and 3B. For example, UE 115-*c* may be an example of a UE 115 and network entity 105-*b* may be an example of a network entity 105 as described with reference to FIGS. 1-3B. In the following description of the process flow 400, the operations between UE 115-*c* and network entity 105-*b* may be transmitted in a different order than the example order shown, or the operations performed may be performed in different orders or at different times. Some operations may also be omitted from the process flow 400, and other operations may be added to the process flow 400.

At 405, UE 115-*c* may transmit, to network entity 105-*b* using an OFDMA signal, an indication that UE 115-*c* supports CDMA transmissions that use an uplink channel. In some cases, the uplink channel may be configured for one or more CDMA transmissions from a set of UEs 115 that includes UE 115-*c*, and may also be configured for one or more OFDM transmissions from another set of UEs 115. In some cases, a CDMA transmission of the one or more CDMA transmissions may be partially concurrent with an OFDM transmission of the one or more OFDM transmissions. As described herein, a CDMA transmission may be at least partially concurrent with an OFDM transmission based on the CDMA transmission and the OFDM transmission at least partially overlapping in time. Additionally or alternatively, a CDMA transmission may be at least partially concurrent with an OFDM transmission based on a time period (e.g., a TTI) in which the CDMA transmission is performed at least partially overlapping with a time period (e.g., a TTI) in which the OFDM transmission is performed.

At 410, UE 115-*c* may receive an indication of one or more parameters for CDMA transmissions that use the uplink channel. In some cases, the parameters may be received before 405 as part of the system information. In some cases, the parameters may be received in response to the indication transmitted at 405.

At 415, network entity 105-*b* may determine whether a received power level of the uplink channel satisfies a threshold power level. Network entity 105-*b* may determine if the threshold is met based on an RoT of the uplink channel.

At 420, network entity 105-*b* may transmit an indication (e.g., overload indication) that the uplink channel supports CDMA transmissions based on determining that the received power level fails to satisfy the threshold power level. In some cases, network entity 105-*b* may transmit an indication (e.g., overload indication) that the uplink channel does not support CDMA transmissions based on determining that the received power level satisfies the threshold power level. UE 115-*c* may determine whether to transmit a CDMA waveform via the uplink channel based on the overload indication. For example, UE 115-*c* may transmit a CDMA signal via the uplink channel using the one or more parameters.

In some cases, at 425, UE 115-*c* may transmit a first RACH message (e.g., MsgA) via the CDMA signal. The first message may include a RACH preamble and a capsule, which may include a data transmission associated with the RACH preamble. UE 115-*c* may transmit the RACH preamble, the capsule, or both, during a time period that is based on a propagation delay of transmissions between UE 115-*c* and network entity 105-*b*.

At 430, in some cases, network entity 105-*b* may receive the CDMA signal via the uplink channel. Network entity 105-*b* may process the signal, including detecting the RACH preamble. For example, network entity 105-*b* may use the RACH preamble to receive the associated capsule.

In some cases, at 435, network entity 105-*b* may transmit a second RACH message (e.g., MsgB) to UE 115-*c*, in response to the first RACH message. In some cases, at 440, UE 115-*c* may transmit a CDMA signal carrying data via the uplink channel using the one or more parameters received at 410, where the CDMA signal may be a data signal transmitted via a data channel. In some cases, UE 115-*c* may transmit the data at a time offset 445 from receiving the second RACH message (e.g., MsgB).

Figure 5:
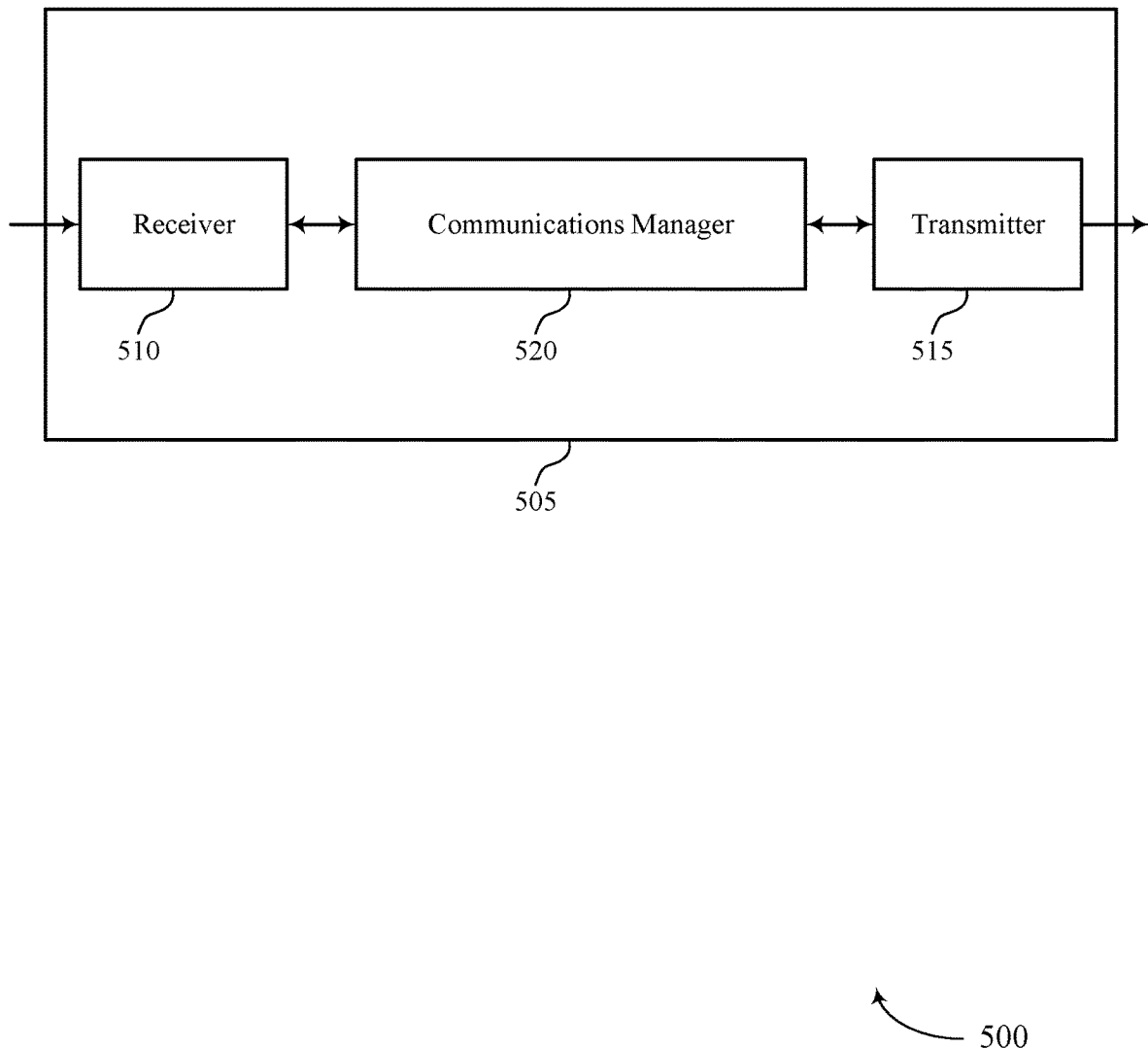
FIGS. 5 and 6 show block diagrams of devices that support concurrent code division and frequency division signaling via an uplink channel in accordance with one or more aspects of the present disclosure.

FIG. 5 shows a block diagram 500 of a device 505 that supports concurrent code division and frequency division signaling via an uplink channel in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to concurrent code division and frequency division signaling via an uplink channel). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to concurrent code division and frequency division signaling via an uplink channel). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of concurrent code division and frequency division signaling via an uplink channel as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The communications manager 520 may be configured as or otherwise support a means for receiving a second indication of one or more parameters for the CDMA transmissions that use the uplink channel. The communications manager 520 may be configured as or otherwise support a means for transmitting a CDMA signal via the uplink channel using the one or more parameters based on transmitting the first indication that the UE supports the CDMA transmissions that use the uplink channel.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption.

Figure 6:
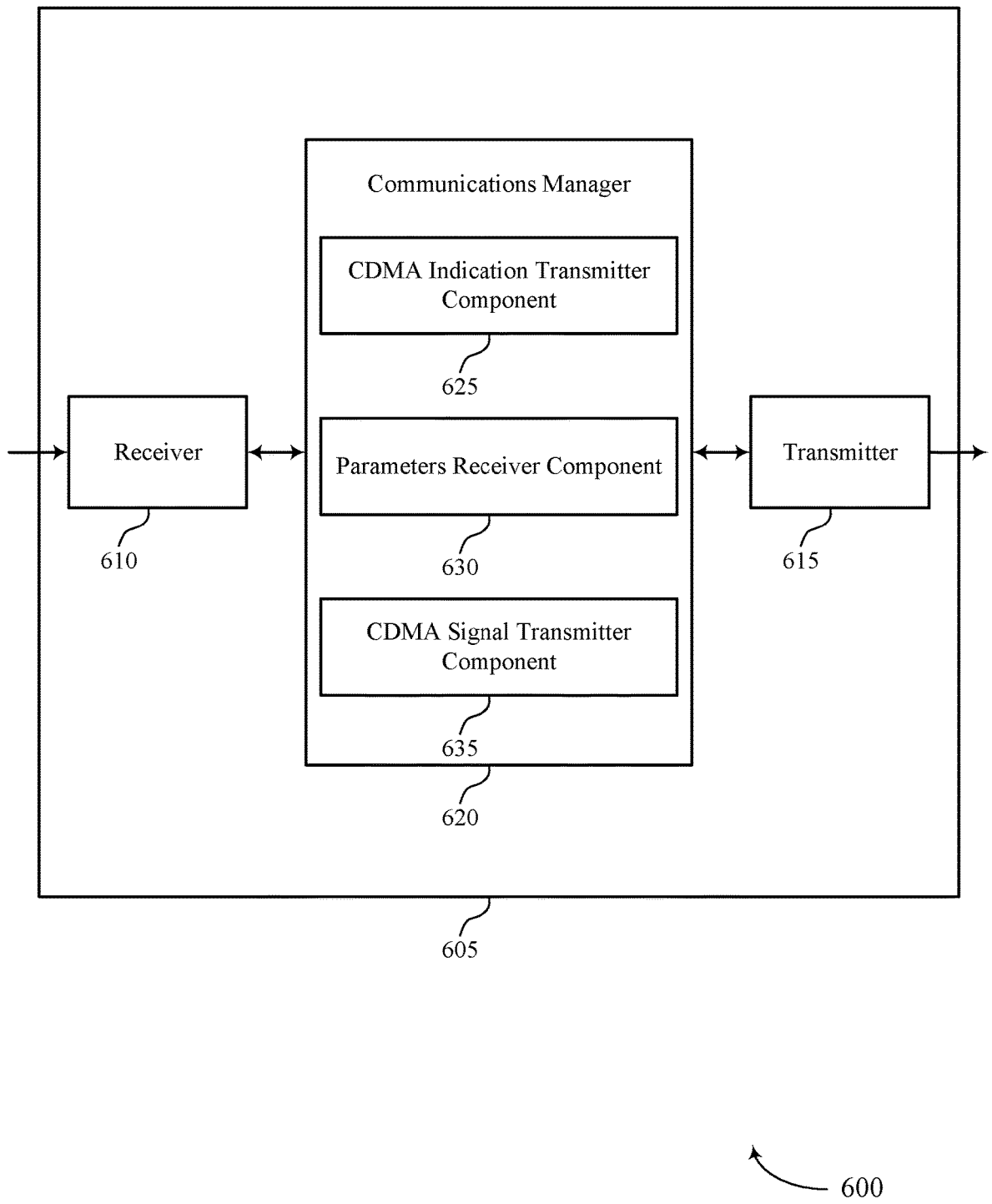

FIG. 6 shows a block diagram 600 of a device 605 that supports concurrent code division and frequency division signaling via an uplink channel in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to concurrent code division and frequency division signaling via an uplink channel). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to concurrent code division and frequency division signaling via an uplink channel). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of concurrent code division and frequency division signaling via an uplink channel as described herein. For example, the communications manager 620 may include a CDMA indication transmitter component 625, a parameters receiver component 630, a CDMA signal transmitter component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The CDMA indication transmitter component 625 may be configured as or otherwise support a means for transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The parameters receiver component 630 may be configured as or otherwise support a means for receiving a second indication of one or more parameters for the CDMA transmissions that use the uplink channel. The CDMA signal transmitter component 635 may be configured as or otherwise support a means for transmitting a CDMA signal via the uplink channel using the one or more parameters based on transmitting the first indication that the UE supports the CDMA transmissions that use the uplink channel.

Figure 7:
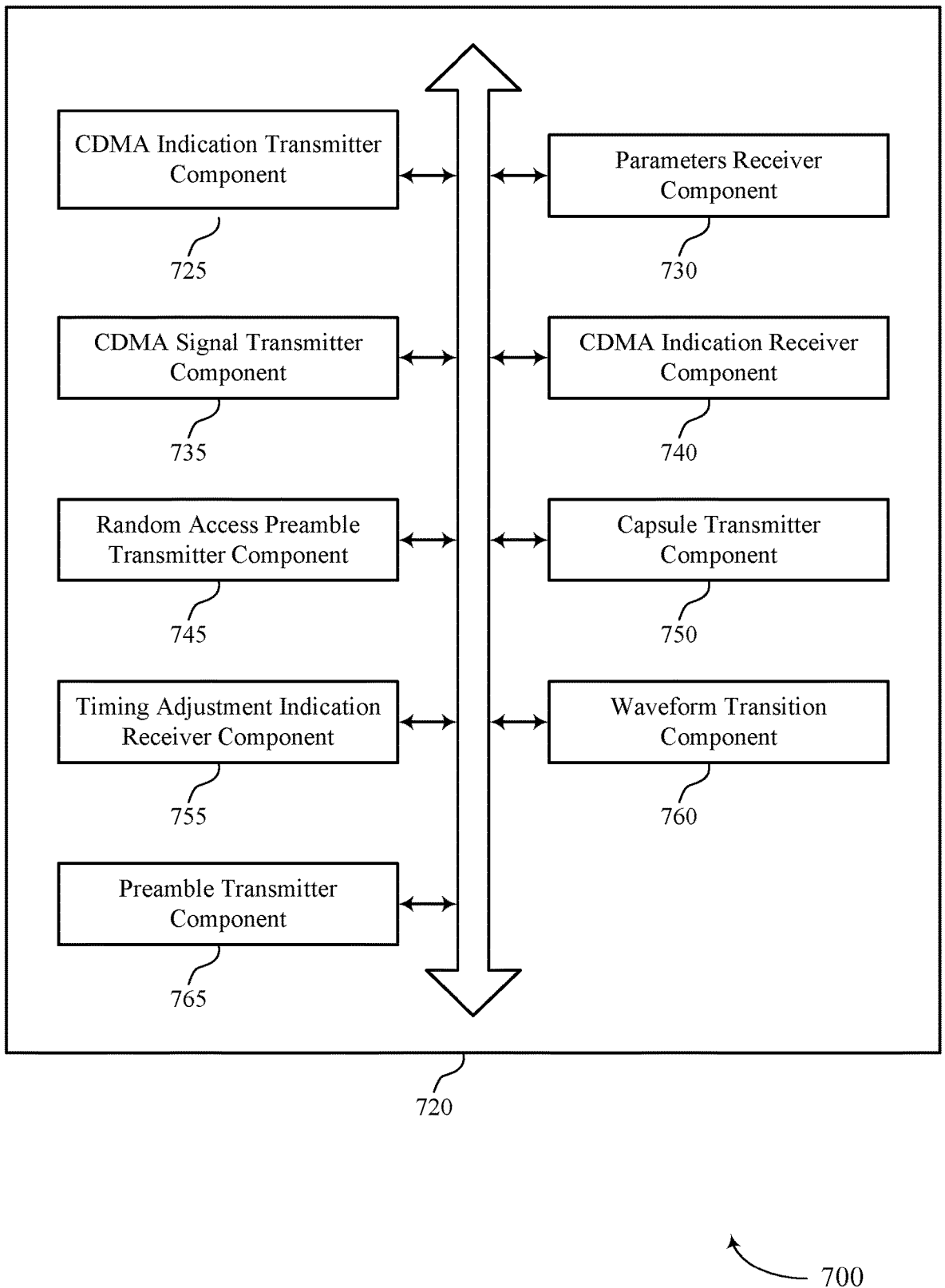
FIG. 7 shows a block diagram of a communications manager that supports concurrent code division and frequency division signaling via an uplink channel in accordance with one or more aspects of the present disclosure.

FIG. 7 shows a block diagram 700 of a communications manager 720 that supports concurrent code division and frequency division signaling via an uplink channel in accordance with one or more aspects of the present disclosure.

The communications manager 720 may be an example of aspects of a communications manager 520, a communications manager 620, or both, as described herein. The communications manager 720, or various components thereof, may be an example of means for performing various aspects of concurrent code division and frequency division signaling via an uplink channel as described herein. For example, the communications manager 720 may include a CDMA indication transmitter component 725, a parameters receiver component 730, a CDMA signal transmitter component 735, a CDMA indication receiver component 740, a random access preamble transmitter component 745, a capsule transmitter component 750, a timing adjustment indication receiver component 755, a waveform transition component 760, a preamble transmitter component 765, or any combination thereof. Each of these components may communicate, directly or indirectly, with one another (e.g., via one or more buses).

The communications manager 720 may support wireless communication at a UE in accordance with examples as disclosed herein. The CDMA indication transmitter component 725 may be configured as or otherwise support a means for transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The parameters receiver component 730 may be configured as or otherwise support a means for receiving a second indication of one or more parameters for the CDMA transmissions that use the uplink channel. The CDMA signal transmitter component 735 may be configured as or otherwise support a means for transmitting a CDMA signal via the uplink channel using the one or more parameters based on transmitting the first indication that the UE supports the CDMA transmissions that use the uplink channel.

In some examples, the CDMA indication receiver component 740 may be configured as or otherwise support a means for receiving, from the network entity, a third indication that the uplink channel supports the CDMA transmissions, where transmitting the CDMA signal is based on receiving the third indication.

In some examples, the CDMA indication receiver component 740 may be configured as or otherwise support a means for receiving, from the network entity, a third indication restricting the CDMA transmissions via the uplink channel. In some examples, the CDMA signal transmitter component 735 may be configured as or otherwise support a means for refraining from transmitting a second CDMA signal based on the third indication, where transmitting the CDMA signal is based on transmission of the CDMA signal occurring before receiving the third indication.

In some examples, to support transmitting the CDMA signal, the random access preamble transmitter component 745 may be configured as or otherwise support a means for transmitting a random access preamble via a RACH. In some examples, to support transmitting the CDMA signal, the capsule transmitter component 750 may be configured as or otherwise support a means for transmitting, via the RACH, a capsule including a data transmission associated with the random access preamble, where the UE transmits the capsule during a time period that is based on a propagation delay of transmissions between the UE and the network entity.

In some examples, the propagation delay is based on a RSRP measurement.

In some examples, a length of the random access preamble is based on the propagation delay.

In some examples, to support transmitting the CDMA signal, the CDMA signal transmitter component 735 may be configured as or otherwise support a means for transmitting, via a data channel, data at a time offset from a RACH transmission, where the time offset is based on a propagation delay of transmissions between the UE and the network entity.

In some examples, the preamble transmitter component 765 may be configured as or otherwise support a means for transmitting, via the data channel and prior to transmission of the data, a preamble associated with the data, where the preamble is used to re-synchronize uplink transmissions from the UE to the network entity.

In some examples, the timing adjustment indication receiver component 755 may be configured as or otherwise support a means for receiving a third indication of a timing adjustment from the network entity. In some examples, the waveform transition component 760 may be configured as or otherwise support a means for transitioning from transmitting a CDMA waveform via the uplink channel to transmitting an OFDM waveform via the uplink channel based on receiving the third indication.

In some examples, uplink transmissions from the UE to the network entity are asynchronous transmissions.

In some examples, the uplink channel includes a set of multiple CDMA sub-channels, the set of multiple CDMA sub-channels based on the one or more parameters for the CDMA transmissions.

In some examples, the UE and the network entity communicate via a NTN.

Figure 8:
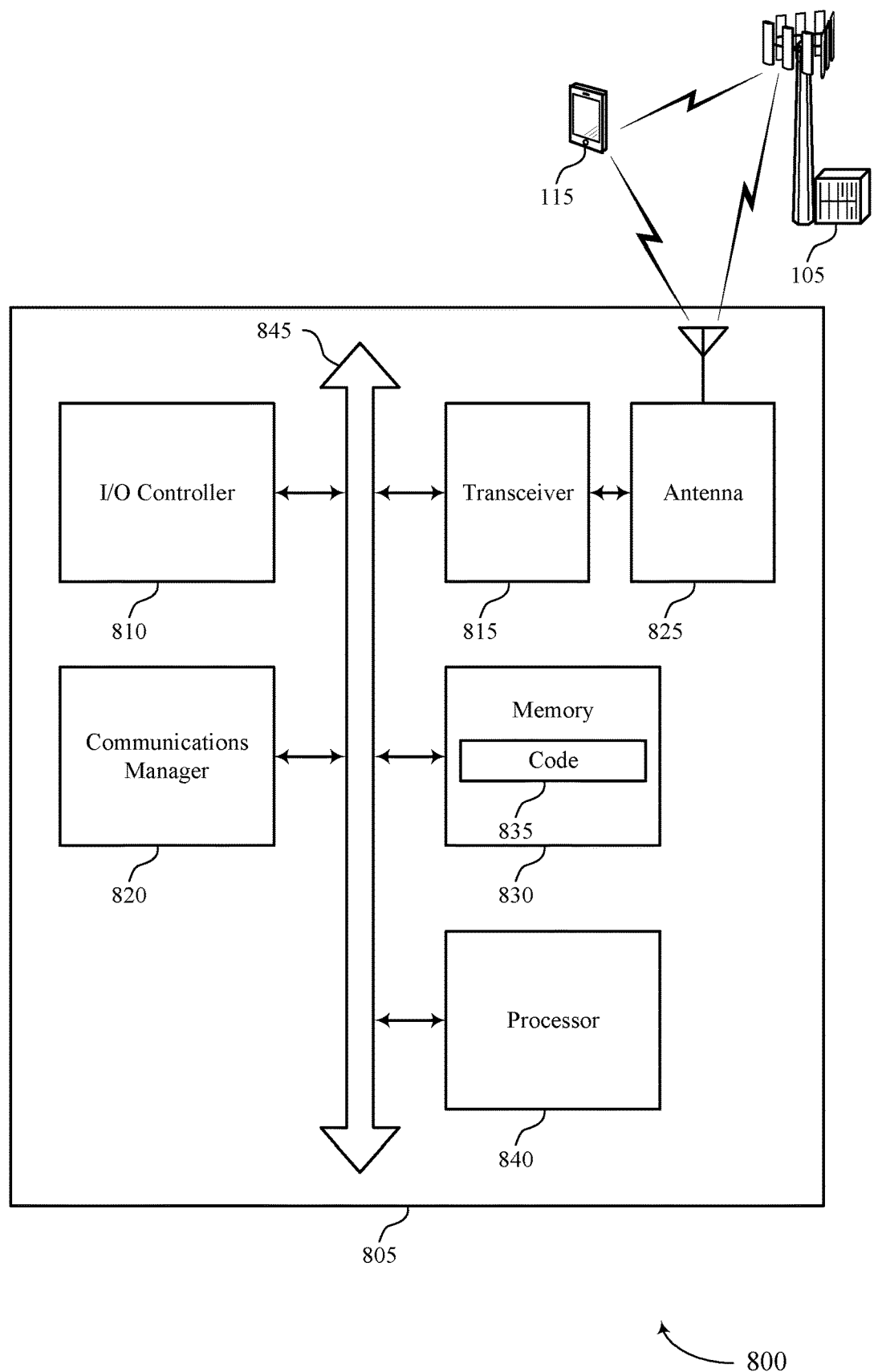
FIG. 8 shows a diagram of a system including a device that supports concurrent code division and frequency division signaling via an uplink channel in accordance with one or more aspects of the present disclosure.

FIG. 8 shows a diagram of a system 800 including a device 805 that supports concurrent code division and frequency division signaling via an uplink channel in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting concurrent code division and frequency division signaling via an uplink channel). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The communications manager 820 may be configured as or otherwise support a means for receiving a second indication of one or more parameters for the CDMA transmissions that use the uplink channel. The communications manager 820 may be configured as or otherwise support a means for transmitting a CDMA signal via the uplink channel using the one or more parameters based on transmitting the first indication that the UE supports the CDMA transmissions that use the uplink channel.

By including or configuring the communications manager 820 in accordance with examples as described herein, the device 805 may support techniques for improved communication reliability, reduced latency, improved user experience related to reduced processing, reduced power consumption, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of concurrent code division and frequency division signaling via an uplink channel as described herein, or the processor 840 and the memory 830 may be otherwise configured to perform or support such operations.

Figure 9:
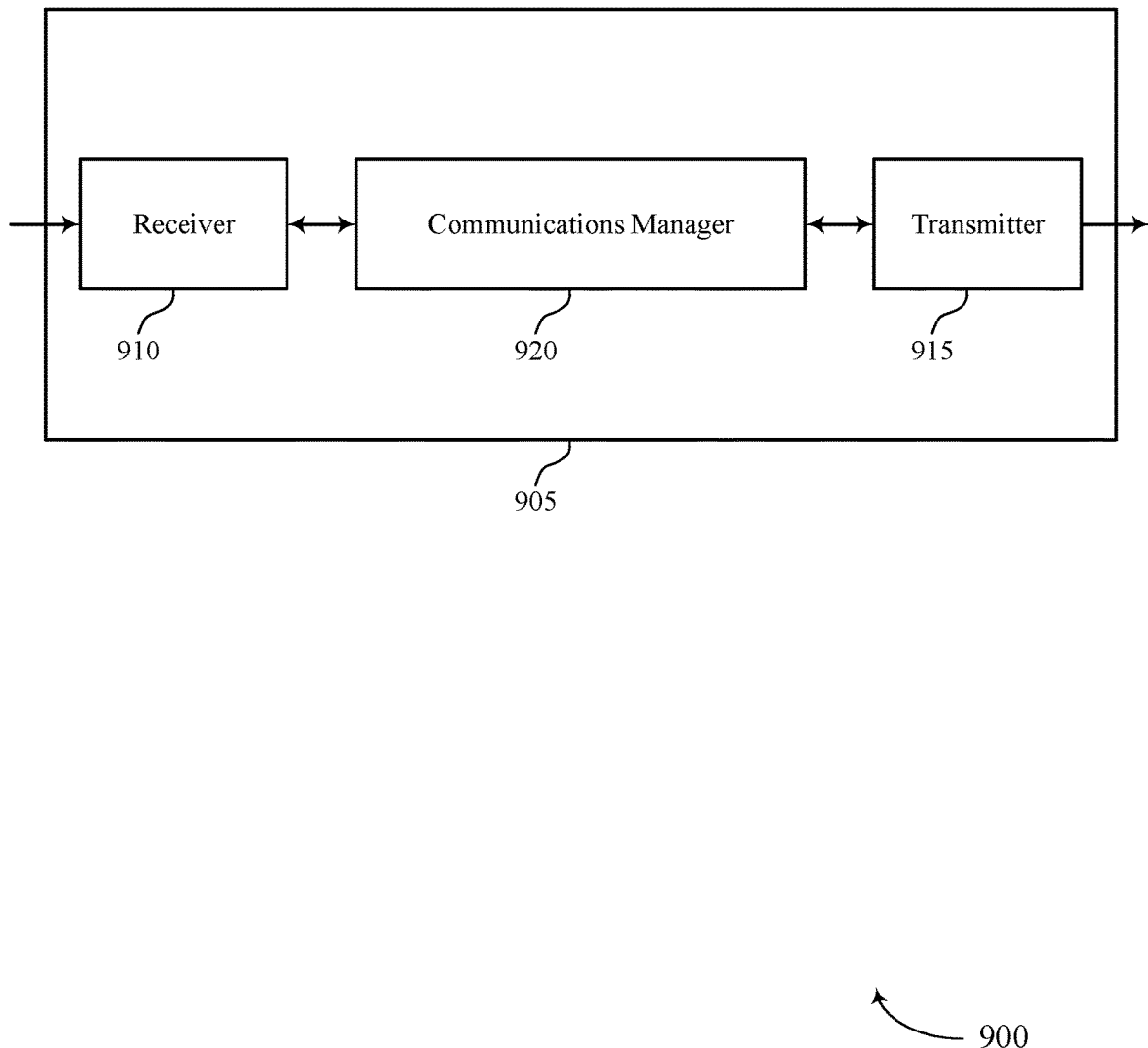
FIGS. 9 and 10 show block diagrams of devices that support concurrent code division and frequency division signaling via an uplink channel in accordance with one or more aspects of the present disclosure.

FIG. 9 shows a block diagram 900 of a device 905 that supports concurrent code division and frequency division signaling via an uplink channel in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of concurrent code division and frequency division signaling via an uplink channel as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The communications manager 920 may be configured as or otherwise support a means for transmitting a second indication of one or more parameters for the CDMA transmissions that use the uplink channel. The communications manager 920 may be configured as or otherwise support a means for receiving a CDMA signal via the uplink channel using the one or more parameters based on receiving the first indication that the UE supports the CDMA transmissions that use the uplink channel.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption.

Figure 10:
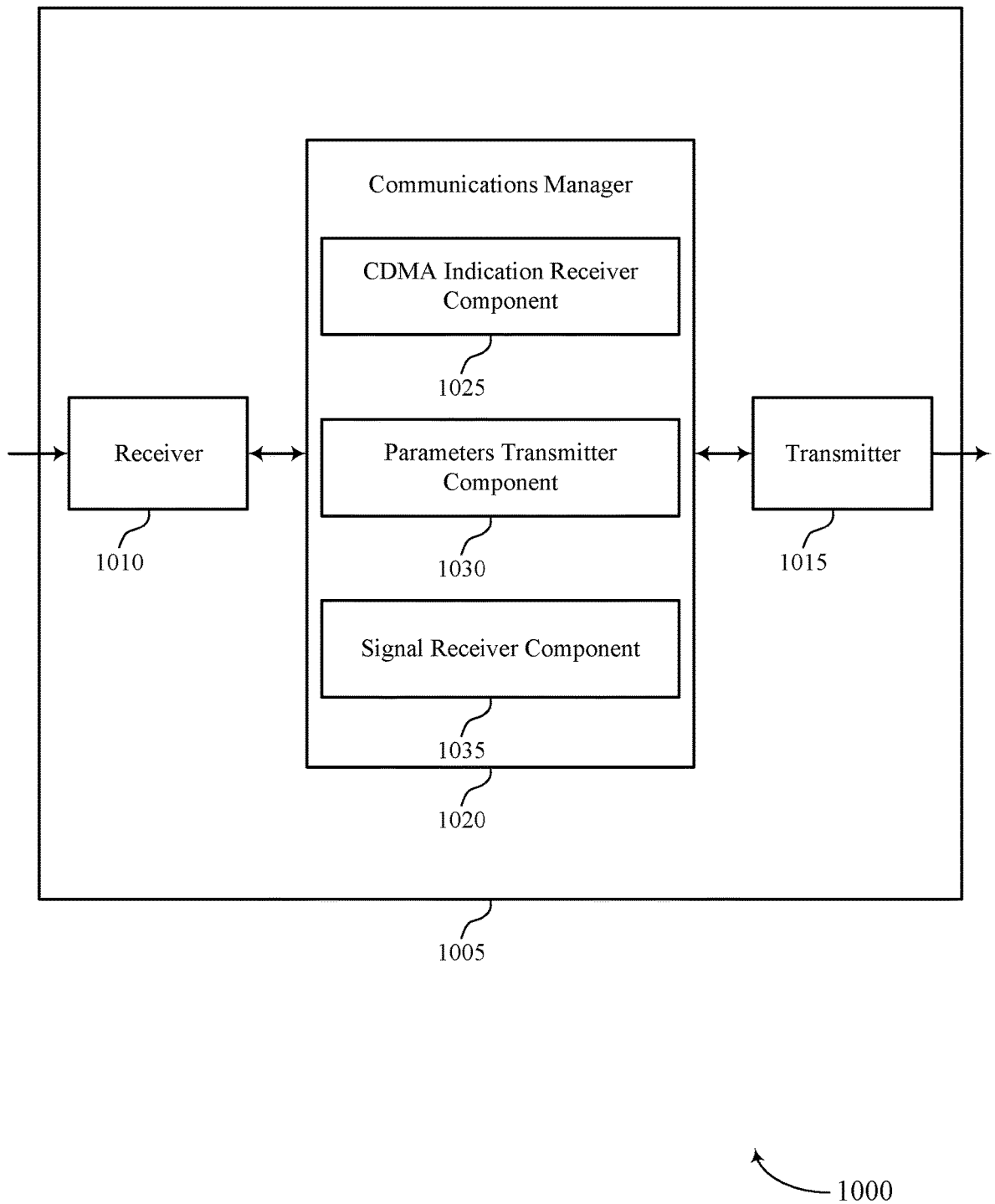

FIG. 10 shows a block diagram 1000 of a device 1005 that supports concurrent code division and frequency division signaling via an uplink channel in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of concurrent code division and frequency division signaling via an uplink channel as described herein. For example, the communications manager 1020 may include a CDMA indication receiver component 1025, a parameters transmitter component 1030, a signal receiver component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver

1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The CDMA indication receiver component 1025 may be configured as or otherwise support a means for receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The parameters transmitter component 1030 may be configured as or otherwise support a means for transmitting a second indication of one or more parameters for the CDMA transmissions that use the uplink channel. The signal receiver component 1035 may be configured as or otherwise support a means for receiving a CDMA signal via the uplink channel using the one or more parameters based on receiving the first indication that the UE supports the CDMA transmissions that use the uplink channel.

Figure 11:
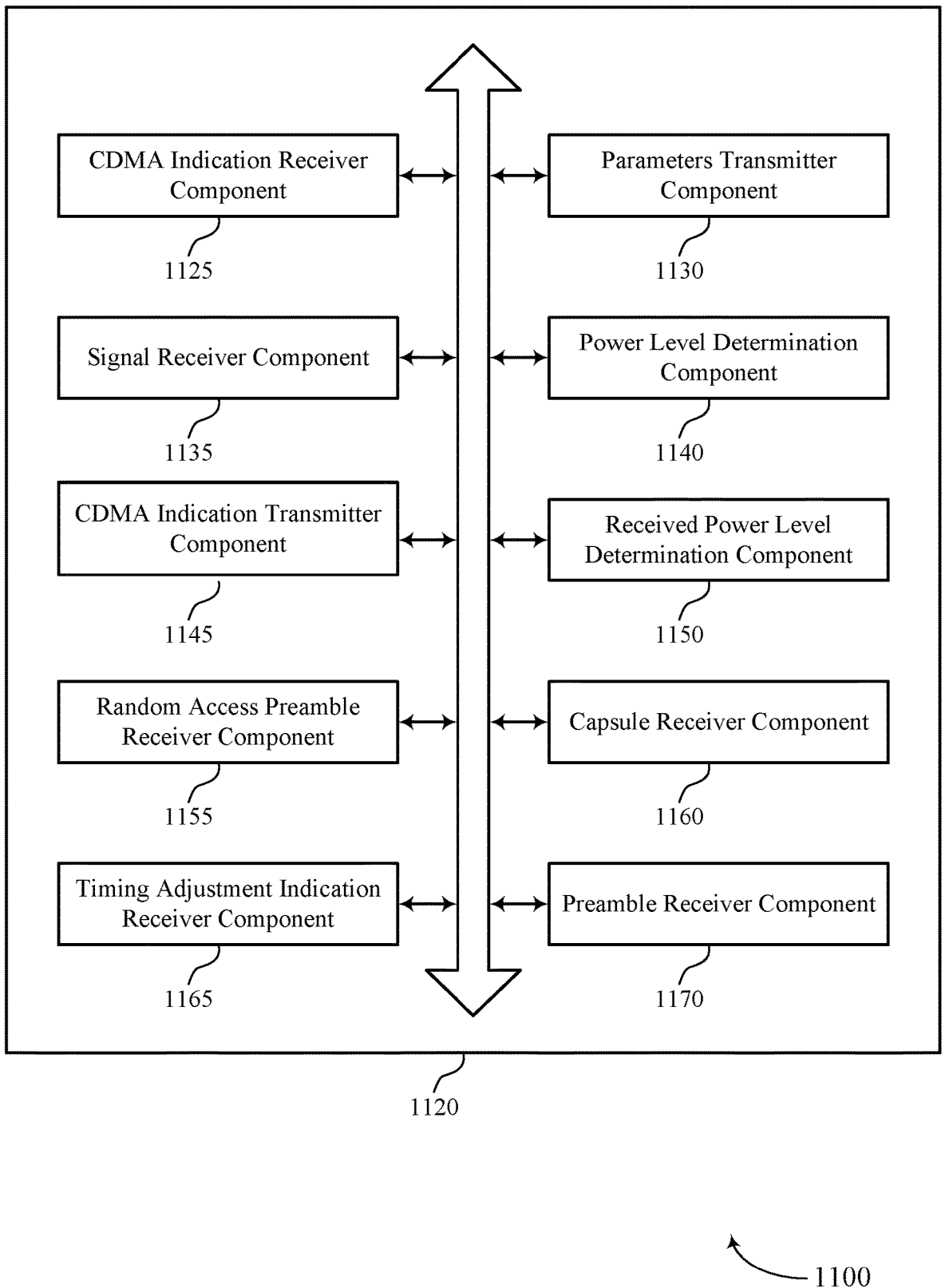
FIG. 11 shows a block diagram of a communications manager that supports concurrent code division and frequency division signaling via an uplink channel in accordance with one or more aspects of the present disclosure.

FIG. 11 shows a block diagram 1100 of a communications manager 1120 that supports concurrent code division and frequency division signaling via an uplink channel in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of concurrent code division and frequency division signaling via an uplink channel as described herein. For example, the communications manager 1120 may include a CDMA indication receiver component 1125, a parameters transmitter component 1130, a signal receiver component 1135, a power level determination component 1140, a CDMA indication transmitter component 1145, a received power level determination component 1150, a random access preamble receiver component 1155, a capsule receiver component 1160, a timing adjustment indication receiver component 1165, a preamble receiver component 1170, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The CDMA indication receiver component 1125 may be configured as or otherwise support a means for receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The parameters transmitter component 1130 may be configured as or otherwise support a means for transmitting a second indication of one or more parameters for the CDMA transmissions that use the uplink channel. The signal receiver component 1135 may be configured as or otherwise support a means for receiving a CDMA signal via the uplink channel using the one or more parameters based on receiving the first indication that the UE supports the CDMA transmissions that use the uplink channel.

In some examples, the power level determination component 1140 may be configured as or otherwise support a means for determining whether a received power level of the uplink channel satisfies a threshold power level. In some examples, the CDMA indication transmitter component 1145 may be configured as or otherwise support a means for transmitting a third indication that the uplink channel supports the CDMA transmissions based on determining that the received power level fails to satisfy the threshold power level, where receiving the CDMA signal is based on transmitting the third indication.

In some examples, the received power level determination component 1150 may be configured as or otherwise support a means for determining whether a received power level of the uplink channel satisfies a threshold power level. In some examples, the CDMA indication receiver component 1125 may be configured as or otherwise support a means for transmitting, for the UE, a third indication restricting the CDMA transmissions via the uplink channel based on determining that the received power level of the uplink channel satisfies the threshold power level.

In some examples, the power level determination component 1140 may be configured as or otherwise support a means for determining whether the received power level of the uplink channel satisfies the threshold power level based on a capability of a receiver of the network entity to detect and cancel interference, where the threshold power level is based on the capability of the receiver of the network entity.

In some examples, to support receiving the CDMA signal, the random access preamble receiver component 1155 may be configured as or otherwise support a means for receiving, via a RACH, a random access preamble associated with the UE. In some examples, to support receiving the CDMA signal, the capsule receiver component 1160 may be configured as or otherwise support a means for receiving, via the RACH, a capsule including a data transmission associated with the random access preamble, where the network entity receives the capsule during a time period that is based on a propagation delay of transmissions between the UE and the network entity.

In some examples, the propagation delay is based on a RSRP measurement.

In some examples, a length of the random access preamble is based on the propagation delay.

In some examples, the signal receiver component 1135 may be configured as or otherwise support a means for receiving, via a data channel, data at a time offset from a RACH transmission, where the time offset is based on a propagation delay of transmissions between the UE and the network entity.

In some examples, the preamble receiver component 1170 may be configured as or otherwise support a means for receiving, via the data channel and prior to reception of the data, a preamble associated with the data, where the preamble is used to re-synchronize uplink transmissions from the UE to the network entity.

In some examples, the timing adjustment indication receiver component 1165 may be configured as or otherwise support a means for transmitting a third indication of a timing adjustment for the UE. In some examples, the signal receiver component 1135 may be configured as or otherwise support a means for receiving, via the uplink channel, a signal associated with the UE, the signal including an OFDM waveform based on the third indication of the timing adjustment.

In some examples, the signal receiver component 1135 may be configured as or otherwise support a means for receiving, via the uplink channel, signaling that includes the CDMA signal and an OFDM signal, where receiving the CDMA signal is based on processing the signaling.

In some examples, the uplink channel includes a set of multiple CDMA sub-channels, the set of multiple CDMA sub-channels based on the one or more parameters for the CDMA transmissions.

In some examples, uplink transmissions from the UE to the network entity are asynchronous transmissions and downlink transmissions from the network entity to the UE are synchronous transmissions.

In some examples, the UE and the network entity communicate via a NTN.

Figure 12:
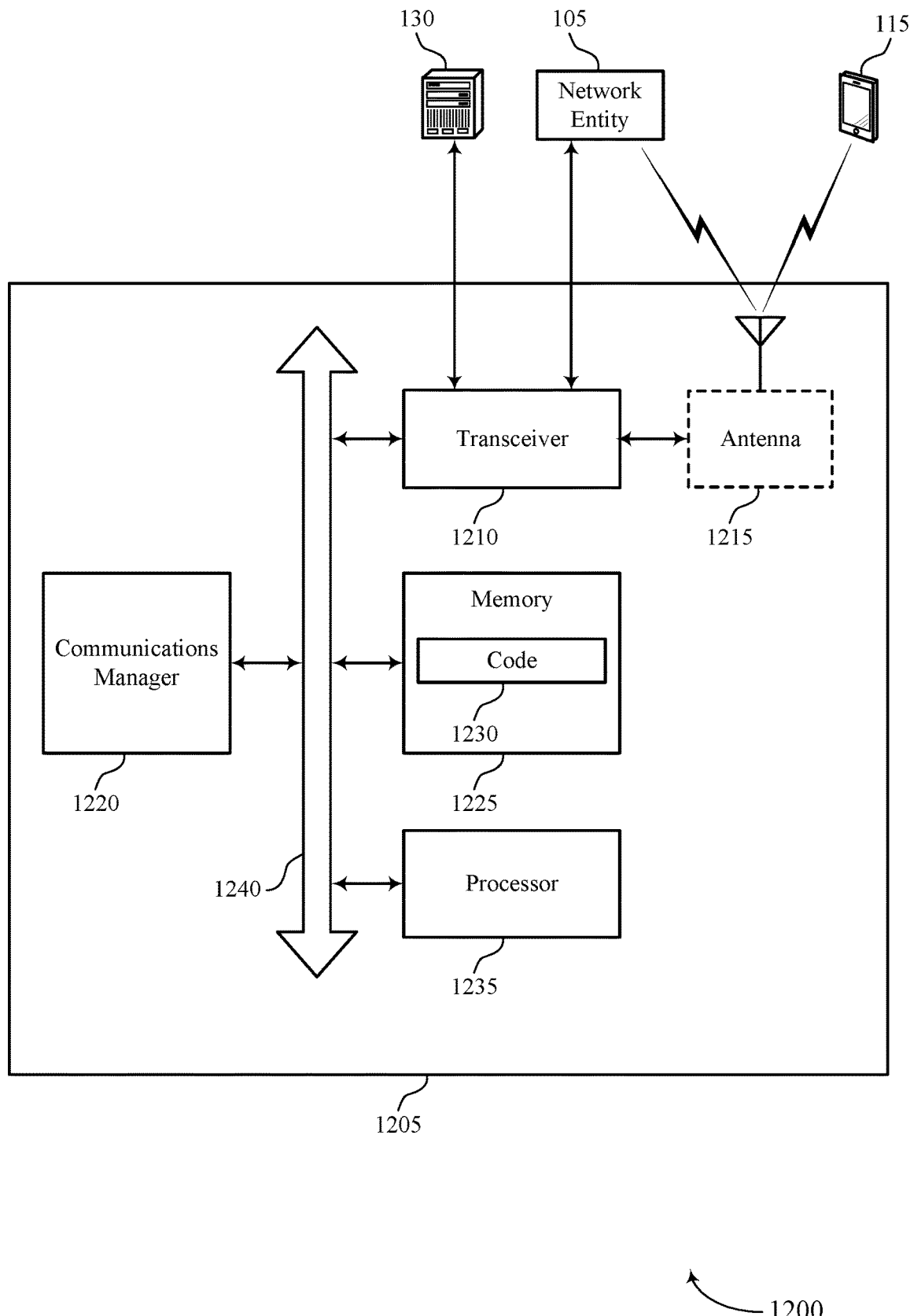
FIG. 12 shows a diagram of a system including a device that supports concurrent code division and frequency division signaling via an uplink channel in accordance with one or more aspects of the present disclosure.

FIG. 12 shows a diagram of a system 1200 including a device 1205 that supports concurrent code division and frequency division signaling via an uplink channel in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting concurrent code division and frequency division signaling via an uplink channel). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The communications manager 1220 may be configured as or otherwise support a means for transmitting a second indication of one or more parameters for the CDMA transmissions that use the uplink channel. The communications manager 1220 may be configured as or otherwise support a means for receiving a CDMA signal via the uplink channel using the one or more parameters based on receiving the first indication that the UE supports the CDMA transmissions that use the uplink channel.

By including or configuring the communications manager 1220 in accordance with examples as described herein, the device 1205 may support techniques for improved communication reliability, reduced latency, improved user experience related to reduced processing, reduced power consumption, and improved coordination between devices.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of concurrent code division and frequency division signaling via an uplink channel as described herein, or the processor 1235 and the memory 1225 may be otherwise configured to perform or support such operations.

Figure 13:
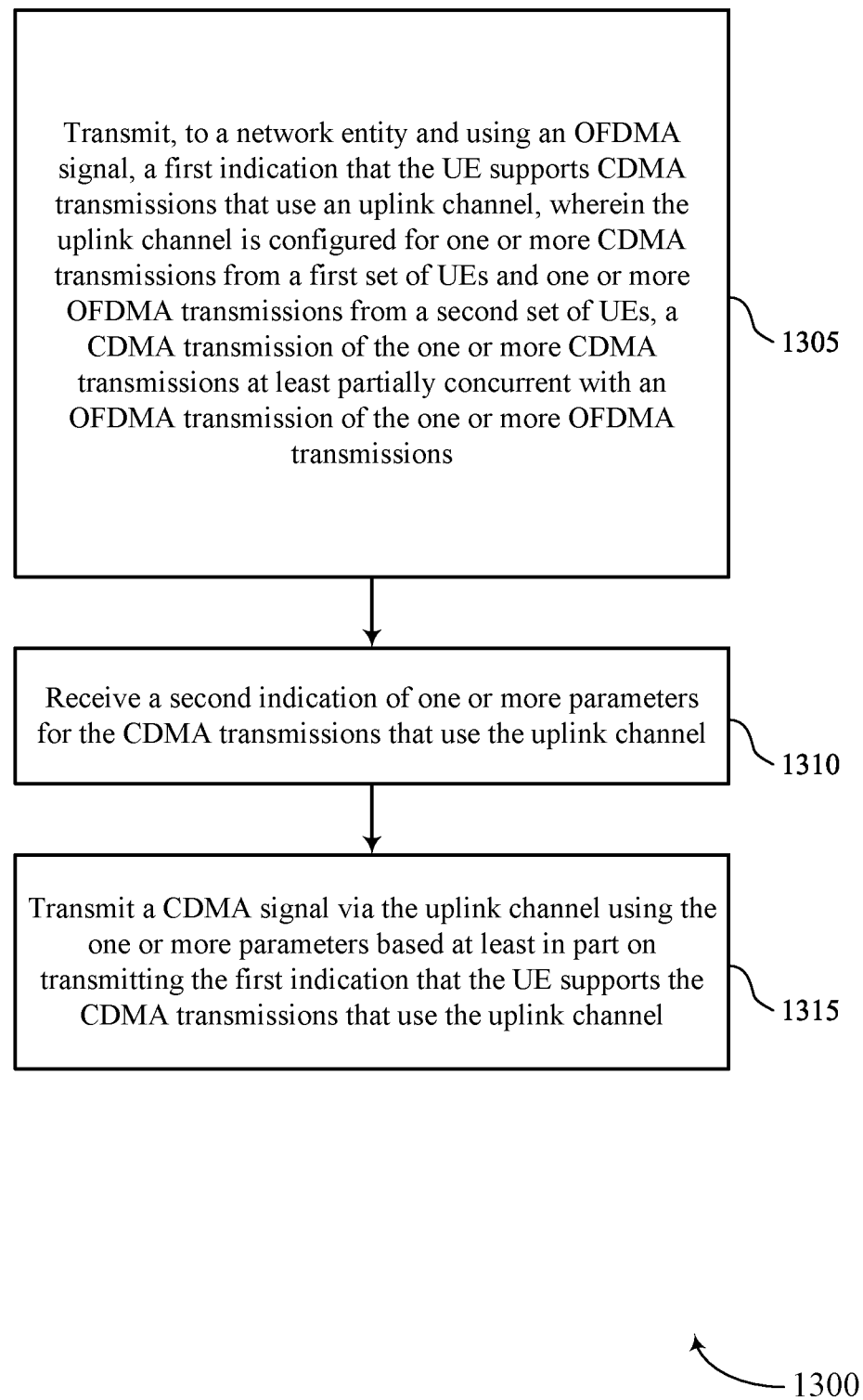
FIGS. 13 through 16 show flowcharts illustrating methods that support concurrent code division and frequency division signaling via an uplink channel in accordance with one or more aspects of the present disclosure.

FIG. 13 shows a flowchart illustrating a method 1300 that supports concurrent code division and frequency division signaling via an uplink channel in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The operations of 1305 may be performed in accordance with examples as disclosed herein. In some examples, aspects of the operations of 1305 may be performed by a CDMA indication transmitter component 725 as described with reference to FIG. 7.

At 1310, the method may include receiving a second indication of one or more parameters for the CDMA transmissions that use the uplink channel. The operations of 1310 may be performed in accordance with examples as disclosed herein. In some examples, aspects of the operations of 1310 may be performed by a parameters receiver component 730 as described with reference to FIG. 7.

At 1315, the method may include transmitting a CDMA signal via the uplink channel using the one or more parameters based on transmitting the first indication that the UE supports the CDMA transmissions that use the uplink channel. The operations of 1315 may be performed in accordance with examples as disclosed herein. In some examples, aspects of the operations of 1315 may be performed by a CDMA signal transmitter component 735 as described with reference to FIG. 7.

Figure 14:
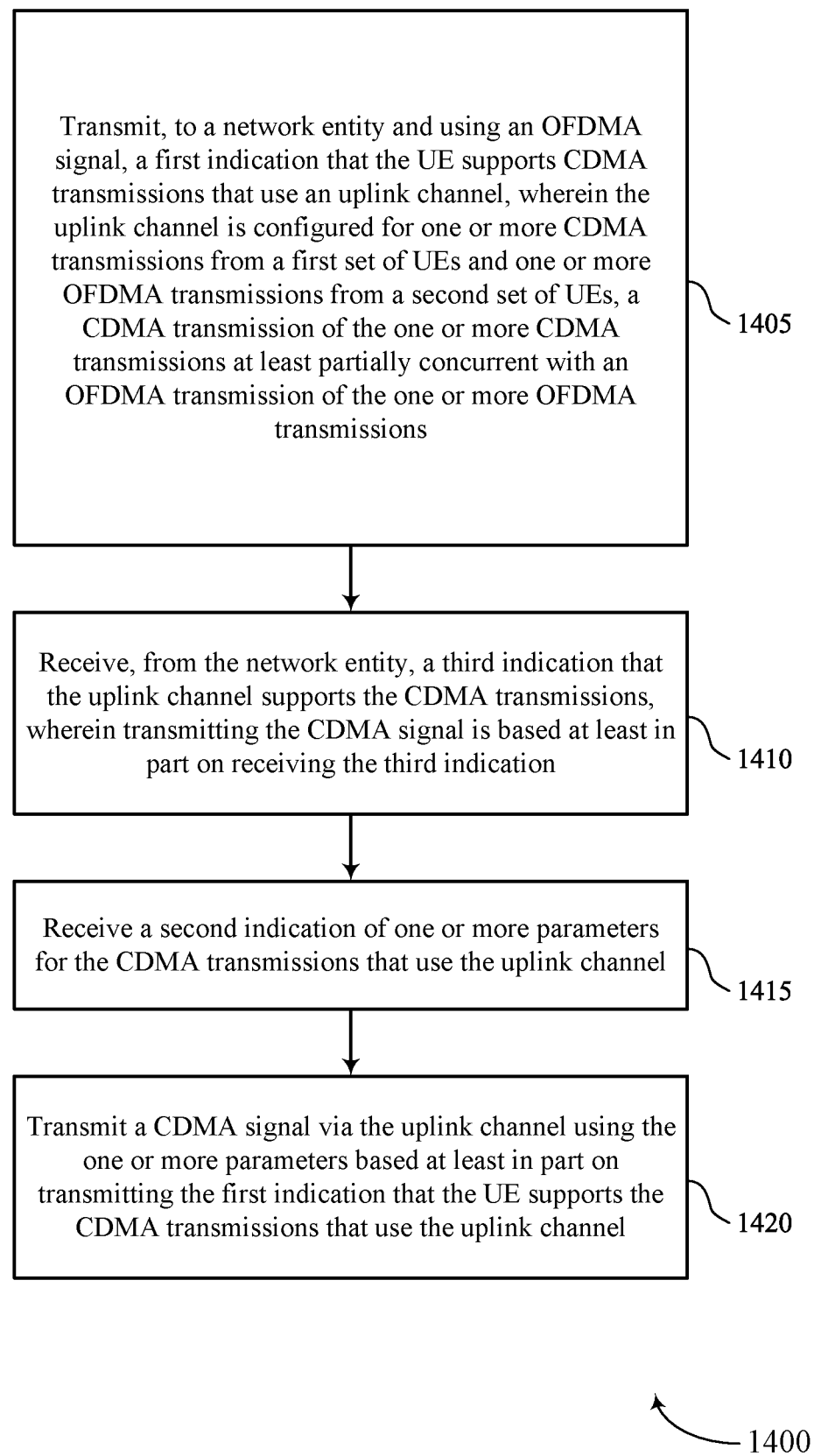

FIG. 14 shows a flowchart illustrating a method 1400 that supports concurrent code division and frequency division signaling via an uplink channel in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity and using an OFDMA signal, a first indication that the UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The operations of 1405 may be performed in accordance with examples as disclosed herein. In some examples, aspects of the operations of 1405 may be performed by a CDMA indication transmitter component 725 as described with reference to FIG. 7.

At 1410, the method may include receiving, from the network entity, a third indication that the uplink channel supports the CDMA transmissions, where transmitting the CDMA signal is based on receiving the third indication. The operations of 1410 may be performed in accordance with examples as disclosed herein. In some examples, aspects of the operations of 1410 may be performed by a CDMA indication receiver component 740 as described with reference to FIG. 7.

At 1415, the method may include receiving a second indication of one or more parameters for the CDMA transmissions that use the uplink channel. The operations of 1415 may be performed in accordance with examples as disclosed herein. In some examples, aspects of the operations of 1415 may be performed by a parameters receiver component 730 as described with reference to FIG. 7.

At 1420, the method may include transmitting a CDMA signal via the uplink channel using the one or more parameters based on transmitting the first indication that the UE supports the CDMA transmissions that use the uplink channel. The operations of 1420 may be performed in accordance with examples as disclosed herein. In some examples, aspects of the operations of 1420 may be performed by a CDMA signal transmitter component 735 as described with reference to FIG. 7.

Figure 15:
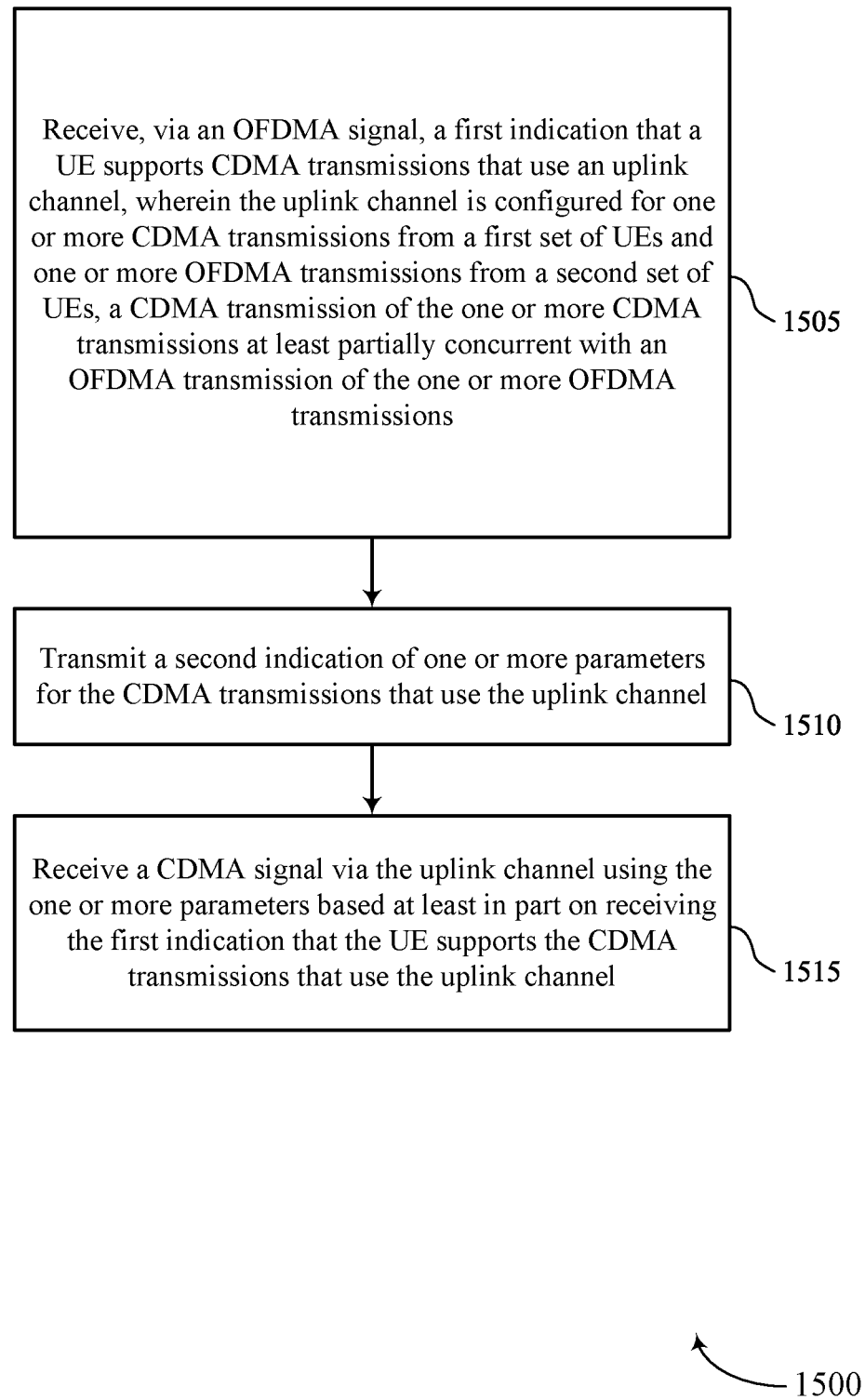

FIG. 15 shows a flowchart illustrating a method 1500 that supports concurrent code division and frequency division signaling via an uplink channel in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The operations of 1505 may be performed in accordance with examples as disclosed herein. In some examples, aspects of the operations of 1505 may be performed by a CDMA indication receiver component 1125 as described with reference to FIG. 11.

At 1510, the method may include transmitting a second indication of one or more parameters for the CDMA transmissions that use the uplink channel. The operations of 1510 may be performed in accordance with examples as disclosed herein. In some examples, aspects of the operations of 1510 may be performed by a parameters transmitter component 1130 as described with reference to FIG. 11.

At 1515, the method may include receiving a CDMA signal via the uplink channel using the one or more parameters based on receiving the first indication that the UE supports the CDMA transmissions that use the uplink channel. The operations of 1515 may be performed in accordance with examples as disclosed herein. In some examples, aspects of the operations of 1515 may be performed by a signal receiver component 1135 as described with reference to FIG. 11.

Figure 16:
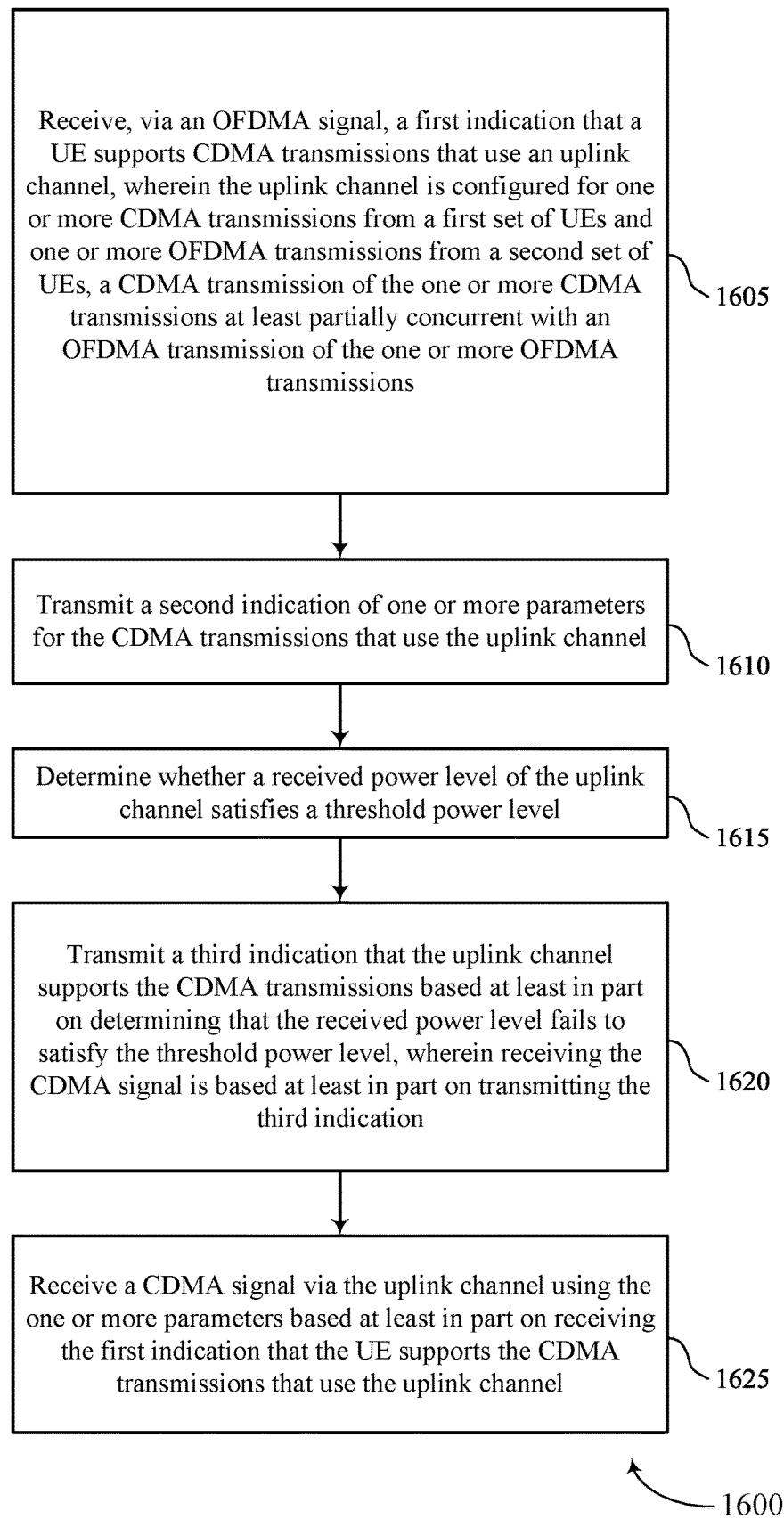

FIG. 16 shows a flowchart illustrating a method 1600 that supports concurrent code division and frequency division signaling via an uplink channel in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include receiving, via an OFDMA signal, a first indication that a UE supports CDMA transmissions that use an uplink channel, where the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions. The operations of 1605 may be performed in accordance with examples as disclosed herein. In some examples, aspects of the operations of 1605 may be performed by a CDMA indication receiver component 1125 as described with reference to FIG. 11.

At 1610, the method may include transmitting a second indication of one or more parameters for the CDMA transmissions that use the uplink channel. The operations of 1610 may be performed in accordance with examples as disclosed herein. In some examples, aspects of the operations of 1610 may be performed by a parameters transmitter component 1130 as described with reference to FIG. 11.

At 1615, the method may include determining whether a received power level of the uplink channel satisfies a threshold power level. The operations of 1615 may be performed in accordance with examples as disclosed herein. In some examples, aspects of the operations of 1615 may be performed by a power level determination component 1140 as described with reference to FIG. 11.

At 1620, the method may include transmitting a third indication that the uplink channel supports the CDMA transmissions based on determining that the received power level fails to satisfy the threshold power level, where receiving the CDMA signal is based on transmitting the third indication. The operations of 1620 may be performed in accordance with examples as disclosed herein. In some examples, aspects of the operations of 1620 may be performed by a CDMA indication transmitter component 1145 as described with reference to FIG. 11.

At 1625, the method may include receiving a CDMA signal via the uplink channel using the one or more parameters based on receiving the first indication that the UE supports the CDMA transmissions that use the uplink channel. The operations of 1625 may be performed in accordance with examples as disclosed herein. In some examples, aspects of the operations of 1625 may be performed by a signal receiver component 1135 as described with reference to FIG. 11.

The following provides an overview of aspects of the present disclosure:

Aspect 1: A method for wireless communication at a UE, comprising: transmitting, to a network entity and using an OFDMA signal, a first indication that the UE supports CDMA transmissions that use an uplink channel, wherein the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions; receiving a second indication of one or more parameters for the CDMA transmissions that use the uplink channel; and transmitting a CDMA signal via the uplink channel using the one or more parameters based at least in part on transmitting the first indication that the UE supports the CDMA transmissions that use the uplink channel.

Aspect 2: The method of aspect 1, further comprising: receiving, from the network entity, a third indication that the uplink channel supports the CDMA transmissions, wherein transmitting the CDMA signal is based at least in part on receiving the third indication.

Aspect 3: The method of any of aspects 1 through 2, further comprising: receiving, from the network entity, a third indication restricting the CDMA transmissions via the uplink channel; and refraining from transmitting a second CDMA signal based at least in part on the third indication, wherein transmitting the CDMA signal is based at least in part on transmission of the CDMA signal occurring before receiving the third indication.

Aspect 4: The method of any of aspects 1 through 3, wherein transmitting the CDMA signal further comprises: transmitting a random access preamble via a RACH; and transmitting, via the RACH, a capsule comprising a data transmission associated with the random access preamble, wherein the UE transmits the capsule during a time period that is based at least in part on a propagation delay of transmissions between the UE and the network entity.

Aspect 5: The method of aspect 4, wherein the propagation delay is based at least in part on a RSRP measurement.

Aspect 6: The method of any of aspects 4 through 5, wherein a length of the random access preamble is based at least in part on the propagation delay.

Aspect 7: The method of any of aspects 1 through 6, wherein transmitting the CDMA signal further comprises: transmitting, via a data channel, data at a time offset from a RACH transmission, wherein the time offset is based at least in part on a propagation delay of transmissions between the UE and the network entity.

Aspect 8: The method of aspect 7, further comprising: transmitting, via the data channel and prior to transmission of the data, a preamble associated with the data, wherein the preamble is used to re-synchronize uplink transmissions from the UE to the network entity.

Aspect 9: The method of any of aspects 1 through 8, further comprising: receiving a third indication of a timing adjustment from the network entity; and transitioning from transmitting a CDMA waveform via the uplink channel to transmitting an OFDM waveform via the uplink channel based at least in part on receiving the third indication.

Aspect 10: The method of any of aspects 1 through 9, wherein uplink transmissions from the UE to the network entity are asynchronous transmissions.

Aspect 11: The method of any of aspects 1 through 10, wherein the uplink channel comprises a plurality of CDMA sub-channels, the plurality of CDMA sub-channels based at least in part on the one or more parameters for the CDMA transmissions.

Aspect 12: The method of any of aspects 1 through 11, wherein the UE and the network entity communicate via an NTN.

Aspect 13: A method for wireless communication at a network entity, comprising: receiving, via an OFDMA signal, a first indication that a UE supports CDMA transmissions that use an uplink channel, wherein the uplink channel is configured for one or more CDMA transmissions from a first set of UEs and one or more OFDMA transmissions from a second set of UEs, a CDMA transmission of the one or more CDMA transmissions at least partially concurrent with an OFDMA transmission of the one or more OFDMA transmissions; transmitting a second indication of one or more parameters for the CDMA transmissions that use the uplink channel; and receiving a CDMA signal via the uplink channel using the one or more parameters based at least in part on receiving the first indication that the UE supports the CDMA transmissions that use the uplink channel.

Aspect 14: The method of aspect 13, further comprising: determining whether a received power level of the uplink channel satisfies a threshold power level; and transmitting a third indication that the uplink channel supports the CDMA transmissions based at least in part on determining that the received power level fails to satisfy the threshold power level, wherein receiving the CDMA signal is based at least in part on transmitting the third indication.

Aspect 15: The method of any of aspects 13 through 14, further comprising: determining whether a received power level of the uplink channel satisfies a threshold power level; and transmitting, for the UE, a third indication restricting the CDMA transmissions via the uplink channel based at least in part on determining that the received power level of the uplink channel satisfies the threshold power level.

Aspect 16: The method of aspect 15, further comprising: determining whether the received power level of the uplink channel satisfies the threshold power level based at least in part on a capability of a receiver of the network entity to detect and cancel interference, wherein the threshold power level is based at least in part on the capability of the receiver of the network entity.

Aspect 17: The method of any of aspects 13 through 16, wherein receiving the CDMA signal comprises: receiving, via a RACH, a random access preamble associated with the UE; and receiving, via the RACH, a capsule comprising a data transmission associated with the random access preamble, wherein the network entity receives the capsule during a time period that is based at least in part on a propagation delay of transmissions between the UE and the network entity.

Aspect 18: The method of aspect 17, wherein the propagation delay is based at least in part on a RSRP measurement.

Aspect 19: The method of any of aspects 17 through 18, wherein a length of the random access preamble is based at least in part on the propagation delay.

Aspect 20: The method of any of aspects 13 through 19, further comprising: receiving, via a data channel, data at a time offset from a RACH transmission, wherein the time offset is based at least in part on a propagation delay of transmissions between the UE and the network entity.

Aspect 21: The method of aspect 20, further comprising: receiving, via the data channel and prior to reception of the data, a preamble associated with the data, wherein the preamble is used to re-synchronize uplink transmissions from the UE to the network entity.

Aspect 22: The method of any of aspects 13 through 21, further comprising: transmitting a third indication of a timing adjustment for the UE; and receiving, via the uplink channel, a signal associated with the UE, the signal comprising an OFDM waveform based at least in part on the third indication of the timing adjustment.

Aspect 23: The method of any of aspects 13 through 22, further comprising: receiving, via the uplink channel, signaling that comprises the CDMA signal and an OFDM signal, wherein receiving the CDMA signal is based at least in part on processing the signaling.

Aspect 24: The method of any of aspects 13 through 23, wherein the uplink channel comprises a plurality of CDMA sub-channels, the plurality of CDMA sub-channels based at least in part on the one or more parameters for the CDMA transmissions.

Aspect 25: The method of any of aspects 13 through 24, wherein uplink transmissions from the UE to the network entity are asynchronous transmissions and downlink transmissions from the network entity to the UE are synchronous transmissions.

Aspect 26: The method of any of aspects 13 through 25, wherein the UE and the network entity communicate via an NTN.

Aspect 27: An apparatus for wireless communication at a UE, comprising a processor; memory coupled with the processor; and instructions stored in the memory and executable by the processor to cause the apparatus to perform a method of any of aspects 1 through 12.

Aspect 28: An apparatus for wireless communication at a UE, comprising at least one means for performing a method of any of aspects 1 through 12.

Aspect 29: A non-transitory computer-readable medium storing code for wireless communication at a UE, the code comprising instructions executable by a processor to perform a method of any of aspects 1 through 12.

Aspect 30: An apparatus for wireless communication at a network entity, comprising a processor; memory coupled with the processor; and instructions stored in the memory and executable by the processor to cause the apparatus to perform a method of any of aspects 13 through 26.

Aspect 31: An apparatus for wireless communication at a network entity, comprising at least one means for performing a method of any of aspects 13 through 26.

Aspect 32: A non-transitory computer-readable medium storing code for wireless communication at a network entity, the code comprising instructions executable by a processor to perform a method of any of aspects 13 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor;
memory coupled with the processor; and
instructions stored in the memory and executable by the processor to cause the UE to:
transmit, to a network entity and using an orthogonal frequency division multiple access signal, a first indication that the UE supports code division multiple access transmissions that use an uplink channel, wherein the uplink channel is configured for one or more code division multiple access transmissions from a first set of one or more UEs and one or more orthogonal frequency division multiple access transmissions from a second set of one or more UEs, a code division multiple access transmission of the one or more code division multiple access transmissions at least partially concurrent with an orthogonal frequency division multiple access transmission of the one or more orthogonal frequency division multiple access transmissions;
receive a second indication of one or more parameters for the code division multiple access transmissions that use the uplink channel;
receive, from the network entity, a third indication that the uplink channel supports the code division multiple access transmissions; and
transmit a code division multiple access signal via the uplink channel using the one or more parameters based at least in part on transmitting the first indication that the UE supports the code division multiple access transmissions that use the uplink channel and receiving the third indication that the uplink channel supports the code division multiple access transmissions.

2. The apparatus of claim 1, wherein the instructions are further executable by the processor to cause the UE to:
receive, from the network entity, a fourth indication restricting the code division multiple access transmissions via the uplink channel; and
refrain from transmitting a second code division multiple access signal based at least in part on the fourth indication, wherein transmitting the code division multiple access signal is based at least in part on transmission of the code division multiple access signal occurring before receiving the fourth indication.

3. The apparatus of claim 1, wherein the instructions to transmit the code division multiple access signal are further executable by the processor to cause the UE to:
transmit a random access preamble via a random access channel; and
transmit, via the random access channel, a capsule comprising a data transmission associated with the random access preamble, wherein the UE transmits the capsule during a time period that is based at least in part on a propagation delay of transmissions between the UE and the network entity.

4. The apparatus of claim 3, wherein the propagation delay is based at least in part on a reference signal received power measurement.

5. The apparatus of claim 3, wherein a length of the random access preamble is based at least in part on the propagation delay.

6. The apparatus of claim 1, wherein the instructions to transmit the code division multiple access signal are further executable by the processor to cause the UE to:
transmit, via a data channel, data at a time offset from a random access channel transmission, wherein the time offset is based at least in part on a propagation delay of transmissions between the UE and the network entity.

7. The apparatus of claim 6, wherein the instructions are further executable by the processor to cause the UE to:
transmit, via the data channel and prior to transmission of the data, a preamble associated with the data, wherein the preamble is used to re-synchronize uplink transmissions from the UE to the network entity.

8. The apparatus of claim 1, wherein the instructions are further executable by the processor to cause the UE to:
receive a fourth indication of a timing adjustment from the network entity; and
transition from transmitting a code division multiple access waveform via the uplink channel to transmitting an orthogonal frequency division multiplexing waveform via the uplink channel based at least in part on receiving the fourth indication.

9. The apparatus of claim 1, wherein uplink transmissions from the UE to the network entity are asynchronous transmissions.

10. The apparatus of claim 1, wherein the uplink channel comprises a plurality of code division multiple access sub-channels, the plurality of code division multiple access sub-channels based at least in part on the one or more parameters for the code division multiple access transmissions.

11. The apparatus of claim 1, wherein the UE and the network entity communicate via a non-terrestrial network.

12. An apparatus for wireless communication at a network entity, comprising:
a processor;
memory coupled with the processor; and
instructions stored in the memory and executable by the processor to cause the network entity to:
receive, via an orthogonal frequency division multiple access signal, a first indication that a user equipment (UE) supports code division multiple access transmissions that use an uplink channel, wherein the uplink channel is configured for one or more code division multiple access transmissions from a first set of one or more UEs and one or more orthogonal frequency division multiple access transmissions from a second set of one or more UEs, a code division multiple access transmission of the one or more code division multiple access transmissions at least partially concurrent with an orthogonal frequency division multiple access transmission of the one or more orthogonal frequency division multiple access transmissions;

transmit a second indication of one or more parameters for the code division multiple access transmissions that use the uplink channel;

transmit a third indication that the uplink channel supports the code division multiple access transmissions based at least in part on a determination that a received power level fails to satisfy a threshold power level; and receive a code division multiple access signal via the uplink channel using the one or more parameters based at least in part on receiving the first indication that the UE supports the code division multiple access transmissions that use the uplink channel and transmitting the third indication that the uplink channel supports the code division multiple access transmissions.

13. The apparatus of claim 12, wherein the instructions are further executable by the processor to cause the network entity to:

transmit, for the UE, a fourth indication restricting the code division multiple access transmissions via the uplink channel based at least in part on a determination that the received power level of the uplink channel satisfies the threshold power level.

14. The apparatus of claim 12, wherein the instructions are further executable by the processor to cause the network entity to:

determine whether the received power level of the uplink channel satisfies the threshold power level based at least in part on a capability of a receiver of the network entity to detect and cancel interference, wherein the threshold power level is based at least in part on the capability of the receiver of the network entity.

15. The apparatus of claim 12, wherein the instructions to receive the code division multiple access signal are executable by the processor to cause the network entity to:

receive, via a random access channel, a random access preamble associated with the UE; and receive, via the random access channel, a capsule comprising a data transmission associated with the random access preamble, wherein the network entity receives the capsule during a time period that is based at least in part on a propagation delay of transmissions between the UE and the network entity.

16. The apparatus of claim 15, wherein the propagation delay is based at least in part on a reference signal received power measurement.

17. The apparatus of claim 15, wherein a length of the random access preamble is based at least in part on the propagation delay.

18. The apparatus of claim 12, wherein the instructions are further executable by the processor to cause the network entity to:

receive, via a data channel, data at a time offset from a random access channel transmission, wherein the time offset is based at least in part on a propagation delay of transmissions between the UE and the network entity.

19. The apparatus of claim 18, wherein the instructions are further executable by the processor to cause the network entity to:

receive, via the data channel and prior to reception of the data, a preamble associated with the data, wherein the preamble is used to re-synchronize uplink transmissions from the UE to the network entity.

20. The apparatus of claim 12, wherein the instructions are further executable by the processor to cause the network entity to:

transmit a fourth indication of a timing adjustment for the UE; and receive, via the uplink channel, a signal associated with the UE, the signal comprising an orthogonal frequency division multiplexing waveform based at least in part on the fourth indication of the timing adjustment.

21. The apparatus of claim 12, wherein the instructions are further executable by the processor to cause the network entity to:

receive, via the uplink channel, signaling that comprises the code division multiple access signal and an orthogonal frequency division multiplexing signal, wherein receiving the code division multiple access signal is based at least in part on processing the signaling.

22. The apparatus of claim 12, wherein the uplink channel comprises a plurality of code division multiple access sub-channels, the plurality of code division multiple access sub-channels based at least in part on the one or more parameters for the code division multiple access transmissions.

23. The apparatus of claim 12, wherein uplink transmissions from the UE to the network entity are asynchronous transmissions and downlink transmissions from the network entity to the UE are synchronous transmissions.

24. The apparatus of claim 12, wherein the UE and the network entity communicate via a non-terrestrial network.

25. A method for wireless communication at a user equipment (UE), comprising:

transmitting, to a network entity and using an orthogonal frequency division multiple access signal, a first indication that the UE supports code division multiple access transmissions that use an uplink channel, wherein the uplink channel is configured for one or more code division multiple access transmissions from a first set of one or more UEs and one or more orthogonal frequency division multiple access transmissions from a second set of one or more UEs, a code division multiple access transmission of the one or more code division multiple access transmissions at least partially concurrent with an orthogonal frequency division multiple access transmission of the one or more orthogonal frequency division multiple access transmissions;

receiving a second indication of one or more parameters for the code division multiple access transmissions that use the uplink channel;

receiving, from the network entity, a third indication that the uplink channel supports the code division multiple access transmissions; and transmitting a code division multiple access signal via the uplink channel using the one or more parameters based at least in part on transmitting the first indication that the UE supports the code division multiple access transmissions that use the uplink channel and receiving the third indication that the uplink channel supports the code division multiple access transmissions.

26. The method of claim 25, further comprising:
receiving, from the network entity, a fourth indication restricting the code division multiple access transmissions via the uplink channel; and
refraining from transmitting a second code division multiple access signal based at least in part on the fourth indication, wherein transmitting the code division multiple access signal is based at least in part on transmission of the code division multiple access signal occurring before receiving the fourth indication.

27. A method for wireless communication at a network entity, comprising:
receiving, via an orthogonal frequency division multiple access signal, a first indication that a user equipment (UE) supports code division multiple access transmissions that use an uplink channel, wherein the uplink channel is configured for one or more code division multiple access transmissions from a first set of one or more UEs and one or more orthogonal frequency division multiple access transmissions from a second set of one or more UEs, a code division multiple access transmission of the one or more code division multiple access transmissions at least partially concurrent with an orthogonal frequency division multiple access transmission of the one or more orthogonal frequency division multiple access transmissions;
transmitting a second indication of one or more parameters for the code division multiple access transmissions that use the uplink channel;
transmitting a third indication that the uplink channel supports the code division multiple access transmissions based at least in part on a determination that a received power level fails to satisfy a threshold power level; and
receiving a code division multiple access signal via the uplink channel using the one or more parameters based at least in part on receiving the first indication that the UE supports the code division multiple access transmissions that use the uplink channel and transmitting the third indication that the uplink channel supports the code division multiple access transmissions.

28. The method of claim 27, further comprising:
transmitting a fourth indication restricting the code division multiple access transmissions via the uplink channel based at least in part on a determination that the received power level of the uplink channel satisfies the threshold power level.

* * * * *